(12) United States Patent
Yamada et al.

(10) Patent No.: US 11,203,320 B2
(45) Date of Patent: Dec. 21, 2021

(54) AIRBAG DEVICE FOR PASSENGER SEAT

(71) Applicant: TOYODA GOSEI CO., LTD., Kiyosu (JP)

(72) Inventors: Ikuo Yamada, Kiyosu (JP); Motoyuki Tanaka, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 144 days.

(21) Appl. No.: 15/996,964

(22) Filed: Jun. 4, 2018

(65) Prior Publication Data
US 2018/0354450 A1  Dec. 13, 2018

(30) Foreign Application Priority Data

Jun. 8, 2017 (JP) .................................. 2017-113797

(51) Int. Cl.
*B60R 21/231* (2011.01)
*B60R 21/239* (2006.01)
(Continued)

(52) U.S. Cl.
CPC ...... *B60R 21/23138* (2013.01); *B60R 21/205* (2013.01); *B60R 21/231* (2013.01);
(Continued)

(58) Field of Classification Search
CPC ... B60R 21/233; B60R 21/205; B60R 21/231; B60R 21/2338; B60R 21/23138;
(Continued)

(56) References Cited

U.S. PATENT DOCUMENTS 5,205,584 A * 4/1993 Honda .................. B60R 21/217
                                                        280/743.2
9,758,123 B2 * 9/2017 Yamada ................ B60R 21/231
(Continued)

FOREIGN PATENT DOCUMENTS

JP  2008-044594 A  2/2008
JP  2013-133049 A  7/2013
(Continued)

OTHER PUBLICATIONS

Takeuchi et al. JP 2017-074939A, English Machine Translation, dated Apr. 20, 2017 ip.com (Year: 2017).*
(Continued)

*Primary Examiner* — Karen Beck
(74) *Attorney, Agent, or Firm* — Posz Law Group, PLC

(57) ABSTRACT

An airbag uses a rear surface side when inflated as an occupant protection section. The occupant protection section includes a frontal collision restriction surface, oblique collision restriction surfaces on left and right sides of the frontal collision restriction surface, and restriction recessed portions between the frontal collision restriction surface and each oblique collision restriction surface. A recessed portion tether links a tip end side of a recess of the restriction recessed portions and a front end side of the airbag to each other to the inside thereof, and when inflated, at the time of dividing the region into two in the left-right direction around the vicinity of the attachment center to the storage part, provides a remote side region on a side away from a driver seat and a driver seat side region. The capacity of the remote side region is smaller than the driver seat side region.

5 Claims, 21 Drawing Sheets

(51) Int. Cl.
    *B60R 21/205*     (2011.01)
    *B60R 21/233*     (2006.01)
    *B60R 21/2338*    (2011.01)
    *B60R 21/00*      (2006.01)

(52) U.S. Cl.
    CPC .......... *B60R 21/233* (2013.01); *B60R 21/239* (2013.01); *B60R 21/2338* (2013.01); *B60R 2021/0009* (2013.01); *B60R 2021/0048* (2013.01); *B60R 2021/23308* (2013.01); *B60R 2021/23382* (2013.01)

(58) Field of Classification Search
    CPC .... B60R 2021/0048; B60R 2021/0009; B60R 2021/23308; B60R 2021/23382
    See application file for complete search history.

(56) References Cited

U.S. PATENT DOCUMENTS

| | | | |
|---|---|---|---|
| 10,829,081 B2 * | 11/2020 | Nakajima | B60R 21/232 |
| 2007/0205591 A1 | 9/2007 | Bito | |
| 2016/0046254 A1 * | 2/2016 | Yamada | B60R 21/233 |
| | | | 280/729 |
| 2016/0200281 A1 * | 7/2016 | Takeshita | B62D 1/11 |
| | | | 280/730.2 |
| 2017/0088083 A1 * | 3/2017 | Hiraiwa | B60R 21/23138 |
| 2018/0126946 A1 * | 5/2018 | Bausch | B60R 21/233 |
| 2018/0154856 A1 * | 6/2018 | Yamada | B60R 21/231 |
| 2018/0345901 A1 * | 12/2018 | Yamada | B60R 21/2338 |
| 2018/0354450 A1 * | 12/2018 | Yamada | B60R 21/23138 |
| 2019/0071047 A1 * | 3/2019 | Zhuang | B60R 21/2342 |
| 2019/0193668 A1 * | 6/2019 | Hayashi | B60R 21/231 |
| 2019/0283702 A1 * | 9/2019 | Yamada | B60R 21/233 |
| 2019/0351862 A1 * | 11/2019 | Aranzulla | B60R 21/231 |
| 2020/0010044 A1 * | 1/2020 | Yamada | B60R 21/23138 |

FOREIGN PATENT DOCUMENTS

| | | | | |
|---|---|---|---|---|
| JP | 2017-061230 A | | 3/2017 | |
| JP | 2017-65399 A | | 4/2017 | |
| JP | 2017-074939 A | | 4/2017 | |
| JP | 2019156349 A | * | 9/2019 | ......... B60R 21/2338 |
| JP | 2020040585 A | * | 3/2020 | ........... B60R 21/233 |
| WO | WO-2013099036 A1 | * | 7/2013 | ......... B60R 21/0136 |
| WO | WO-2019155801 A1 | * | 8/2019 | ........... B60R 21/205 |

OTHER PUBLICATIONS

Office Action dated May 28, 2020 issued in the corresponding JP patent application No. 2017-113797 (with English translation).
Office Action dated Aug. 31, 2020 in corresponding Japanese Patent Application No. 2017-113797 (and English translation).

* cited by examiner

AIRBAG DEVICE FOR PASSENGER SEAT

CROSS REFERENCE TO RELATED APPLICATIONS

The present application claims priority from Japanese Patent Application No. 2017-113797 of Yamada et al., filed on Jun. 8, 2017, the entire disclosure of which is incorporated herein by reference.

BACKGROUND OF THE INVENTION

Field of the Invention

The invention relates to an airbag device for a passenger seat including an airbag which is folded and stored in a storage part provided in an instrument panel disposed in front of an occupant seated in the passenger seat, to inflate to protrude toward a rear side of a vehicle by allowing an inflation gas to flow to the inside thereof, and to be capable of protecting the occupant.

Background Art

In the related art, JP-A-2016-132385 discloses an airbag device for a passenger seat. In the airbag device for a passenger seat of the related art, a rear surface side of an airbag at airbag deployment is configured as an occupant protection section which is capable of protecting an occupant, the occupant protection section includes a frontal collision restriction surface which is capable of protecting a head of the occupant when frontal collision of a vehicle occurs and an oblique collision restriction surface which is capable of protecting the head of the occupant when oblique collision or offset collision of the vehicle occurs, and a restriction recessed portion for allowing the head of the occupant to enter and to be restricted is disposed between the frontal collision restriction surface and the oblique collision restriction surface. The restriction recessed portion is recessed forward by utilizing a tether disposed on the inside thereof when the inflation of the airbag is completed.

In the airbag device for a passenger seat having such a configuration, the oblique collision restriction surface is for protecting the head of the occupant who moves obliquely forward. In addition, the airbag will inflate such that a region on the front side of the part having the oblique collision restriction surface significantly bulges outward. In addition, in a case where the oblique collision restriction surfaces are disposed both on the left and right sides of the frontal collision restriction surface, on a remote side away from a driver seat (the exterior side of the vehicle), a window disposed on the side of the passenger seat, a door trim disposed on the lower side of the window, a head protecting airbag which inflates so as to cover the interior side of the side window of the passenger seat, and the like, are disposed close to each other. Therefore, on the remote side away from the driver seat (exterior side of the vehicle), it is difficult to ensure a space when the inflation of the airbag is completed, and there is room for improvement from the viewpoint that the airbag inflates by suppressing interference with the close member.

SUMMARY OF THE INVENTION

An object of the present invention is to provide an airbag device for a passenger seat which can quickly inflate an airbag and can properly protect the head of an occupant even when an oblique collision restriction surface is provided both on the left and right sides of a frontal collision restriction surface.

The object of the invention can be achieved by the airbag device for a passenger seat having the following configuration.

According to an aspect of the invention, there is provided an airbag device for a passenger seat including: an airbag which is folded and stored in a storage part provided in an instrument panel disposed in front of an occupant seated in a passenger seat, to inflate to protrude toward a rear side of a vehicle by allowing an inflation gas to flow to the inside thereof, and to be capable of protecting the occupant, in which a front end side of the airbag when inflation is completed is attached to the storage part, and a rear surface side of the airbag when inflation is completed is configured as an occupant protection section which is capable of protecting the occupant, in which the occupant protection section includes a frontal collision restriction surface which is capable of protecting a head of the occupant who moves forward when frontal collision of the vehicle occurs, two oblique collision restriction surfaces which are formed both on the left and right sides of the frontal collision restriction surface to be capable of protecting the head of the occupant who moves obliquely forward when oblique collision or offset collision of the vehicle occurs, and restriction recessed portions which are respectively installed to be recessed forward between the frontal collision restriction surface and each of the oblique collision restriction surfaces for allowing the head of the occupant to enter and to be restricted, in which the airbag is configured to install a recessed portion tether which links a tip end side of a recess of each of the restriction recessed portions and a front end side of the airbag, to the inside thereof, in which, when the inflation is completed, at the time of substantially dividing the region into two around the vicinity of the attachment center to the storage part in the left-right direction, a remote side region disposed on a side away from a driver seat and a driver seat side region disposed on the driver seat side are provided, and in which the capacity of the remote side region is set to be smaller than that of the driver seat side region.

In the airbag device for a passenger seat of the invention, even when the occupant protection section of the airbag includes the oblique collision restriction surfaces both on the left and right sides of the frontal collision restriction surface, when the inflation is completed, the airbag is set the capacity of the remote side region disposed on the side away from the driver seat to be smaller than that of the driver seat side region disposed on the driver seat side. In other words, in the airbag device for a passenger seat according to the invention, in the region on the driver seat side on which an inflation space is wide, that is, on which there is no obstruction, by largely inflating the part (driver seat side region) at which the oblique collision restriction surface is provided, it is possible to properly receive the head of the occupant who moves obliquely forward on the driver seat side by the oblique collision restriction surface. In addition, even when the inflation of the head protecting airbag is completed to cover the side window of the passenger seat in the region on the side remote from the driver seat where there is little margin in the inflation space, it is possible to dispose the remote side region of which the capacity is set to be smaller than that of the driver seat side region without any trouble by suppressing interference with the close member. Further, even in the configuration in which the capacity is set to be small in the remote side region, on the side remote from the driver seat in the passenger seat, the above-described head protecting airbag, the window, or the door trim are disposed to be close to the inflated remote side region, and thus, it is possible to receive the head of the occupant who is remote from the driver seat and moves obliquely forward on the exterior of the vehicle without any trouble by the oblique collision restriction surface of the remote side region which is in a state of being supported by the head protecting airbag or the like. Furthermore, in the airbag device for a passenger seat of the invention, in the occupant protection section of the airbag, the restriction recessed portion which is recessed forward is installed between the frontal collision restriction surface and each of the oblique collision restriction surfaces. Each of the restriction recessed portions is respectively properly maintained in a recessed state by the recessed portion tether linked to the front end side of the airbag when the inflation of the airbag is completed, and it is also possible to prevent front-rear movement (front-rear swinging) of the restriction recessed portion at the time of development and inflation of the airbag by the recessed portion tether. Therefore, the restriction recessed portion can be quickly disposed at a predetermined position, and it is possible to properly receive the head of the occupant who moves obliquely forward on the driver seat side or obliquely forward on the exterior of the vehicle away from the driver seat by allowing the head to enter the restriction recessed portion, respectively.

Therefore, in the airbag device for a passenger seat of the invention, even when the oblique collision restriction surface is provided both on the left and right sides of the frontal collision restriction surface, it is possible to quickly inflate the airbag and to properly protect the head of the occupant.

In addition, in the airbag device for a passenger seat of the invention, it is preferable that the airbag includes a main body inflation portion and two protrusion inflation portions which are disposed to protrude rearward from a rear surface of the main body inflation portion when the inflation is completed, and disposed to be remote from each other in the left-right direction, the frontal collision restriction surface is configured with a rear surface of the main body inflation portion when the inflation is completed, and in each of the protrusion inflation portions, when the inflation is completed, side wall portions disposed to protrude rearward from the rear surface of the main body inflation portion respectively configure the oblique collision restriction surface.

In the airbag device for a passenger seat as described above, when the inflation of the airbag is completed, by receiving the head of the occupant who moves obliquely forward by the oblique collision restriction surface disposed to protrude rearward from the restriction recessed portion and by moving the head forward along the oblique collision restriction surface, it is possible to guide the head to the restriction recessed portion side. Therefore, when the oblique collision or the offset collision of the vehicle occurs, it is possible for the restriction recessed portion to receive the head of the occupant who moves obliquely forward more stably.

In addition, specifically, it is preferable that, in the protrusion inflation portion, a protrusion amount from the main body inflation portion at airbag deployment of a remote side protrusion inflation portion disposed on the side remote from the drive seat is set to be smaller than that of a driver seat side protrusion inflation portion disposed on the driver seat side, and it is possible to further prevent interference with the head protection airbag or the like.

Furthermore, in the airbag device for a passenger seat having the above-described configuration, it is preferable that, on the inside of the airbag, a front-and-rear tether which is capable of suppressing rearward movement of the frontal collision restriction surface at airbag deployment is installed to extend rearward from the attachment center and substantially along a front-rear direction at airbag deployment, which can link the frontal collision restriction surface and the front end side of the airbag are linked to each other, and on the frontal collision restriction surface, a length in the left-right direction of airbag deployment at a driver seat side part disposed to be closer to the driver seat side than the front-and-rear tether is set to be greater than that of a remote side part disposed to be closer to the remote side away from the driver seat than the front-and-rear tether.

By configuring the airbag device for a passenger seat as described above, it is possible to suppress the rearward movement of the frontal collision restriction surface when the inflation of the airbag is completed, and to smoothly arrange the frontal collision restriction surface to face the front of the occupant. In addition, it is also possible to suppress a case where the frontal collision restriction surface inflates to excessively protrude rearward in the initial stage of the inflation of the airbag.

DETAILED DESCRIPTION OF THE INVENTION

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
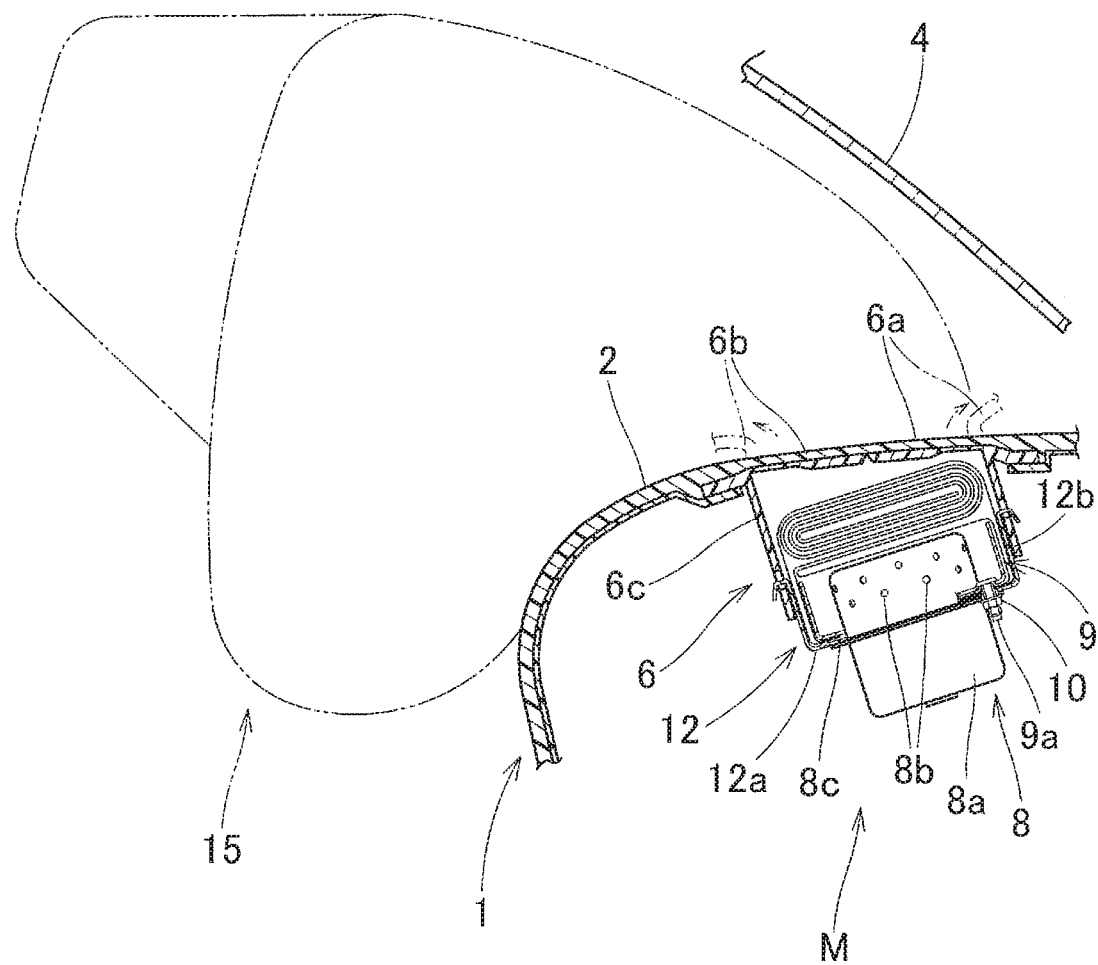
FIG. 1 is a schematic longitudinal sectional view illustrating a state where an airbag device for a passenger seat which is an embodiment of the invention is loaded in a vehicle.
Figure 2:
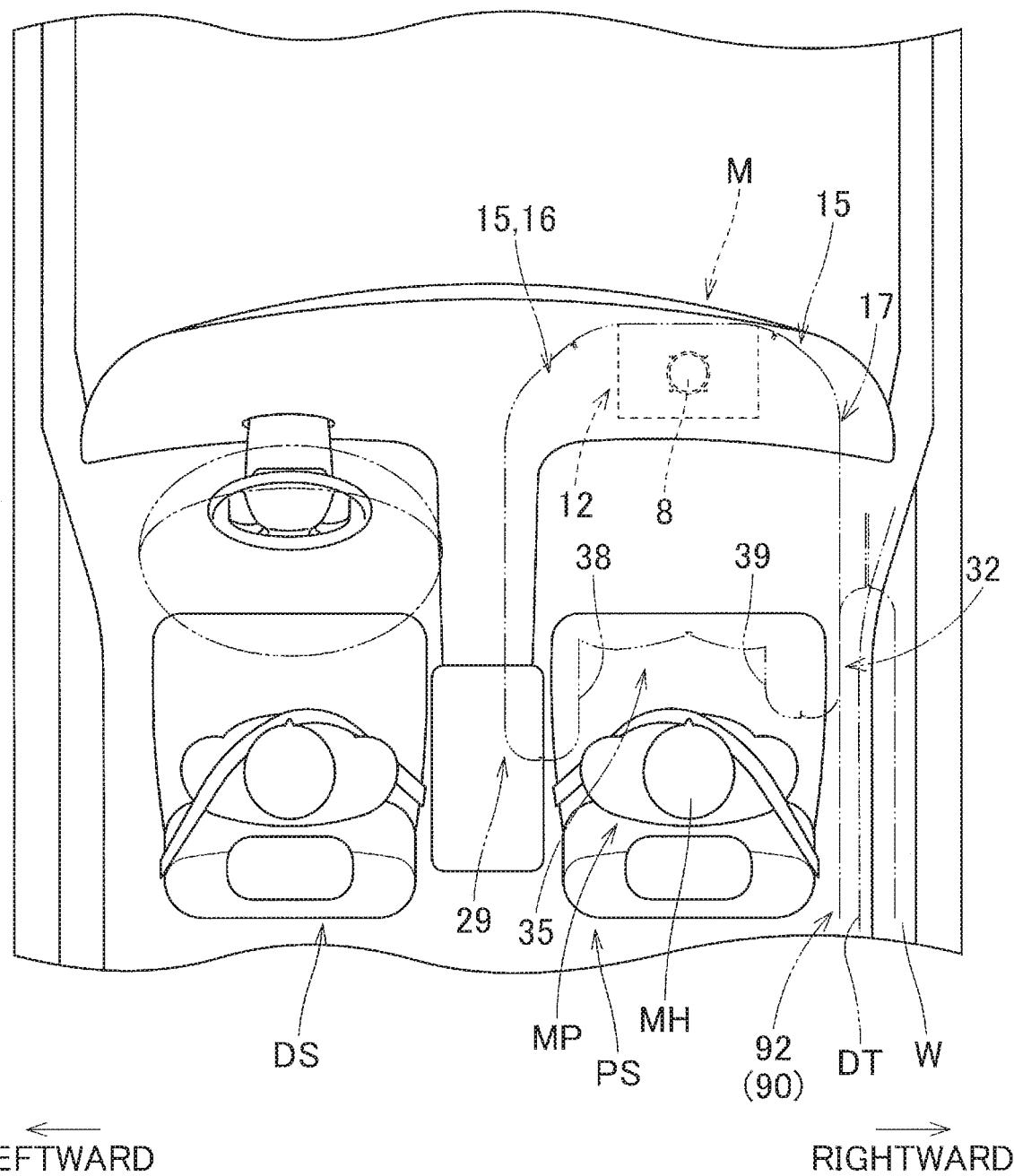
FIG. 2 is a schematic plan view of a state where the airbag device for a passenger seat of the embodiment is loaded in the vehicle.

Hereinafter, one embodiment of the invention will be described based on the drawings. As illustrated in FIGS. 1 and 2, an airbag device M for a passenger seat of the embodiment is a top-down type which is disposed on the inside of an upper surface 2 of an instrument panel 1 in front of a passenger seat PS in a vehicle V. In addition, in the embodiment, the front-rear, up-down, and left-right directions are identical to the front-rear, up-down, and left-right directions of the vehicle V, which are not particularly limited.

As illustrated in FIG. 1, the airbag device M for a passenger seat of the embodiment includes: a folded airbag 15; an inflator 8 which supplies an inflation gas to the airbag 15; a case 12 which serves as a storage part in which the airbag 15 and the inflator 8 are stored and held; a retainer 9 for attaching the airbag 15 and the inflator 8 to the case 12; and an airbag cover 6 which covers an upper part of the folded airbag 15.

The airbag cover 6 is formed to be integrated with the instrument panel 1 made of a synthetic resin, and includes two front and rear door portions 6a and 6b to open being pressed to the airbag 15 when developing and inflating the airbag 15. In addition, a linking wall portion 6c linked to the case 12 is formed around the door portions 6a and 6b in the airbag cover 6.

As illustrated in FIG. 1, the inflator 8 includes: a substantially columnar main body portion 8a having a plurality of gas discharge ports 8b; and a flange portion 8c for attaching the inflator 8 to the case 12. In a case of the embodiment, the inflator 8 is configured to be operated when frontal collision, oblique collision, and offset collision of the vehicle V occur.

The case 12 that serves as a storage part is formed in a substantially rectangular parallelepiped shape made of a sheet metal having a rectangular opening on the upper end side. As illustrated in FIG. 1, the case 12 includes: a substantially rectangular bottom wall portion 12a attached by inserting the inflator 8 from below; and a circumferential wall portion 12b which extends upward from an outer circumferential edge of the bottom wall portion 12a and locks a linking wall portion 6c of the airbag cover 6. In a case of the embodiment, the airbag 15 and the inflator 8 are linked to the bottom wall 12a of the case 12, to which each bolt 9a of the retainer 9 disposed in the airbag 15 to pass through a circumferential edge of a gas inflow port 21 and the bottom wall portion 12a of the case 12, and the flange portion 8c of the inflator 8, then by locking a nut 10. Specifically, the bottom wall portion 12a of the case 12 has a configuration that is wider in the left-right direction and, the inflator 8 is attached at the center in the left-right direction of the bottom wall 12a. In addition, in the bottom wall portion 12a of the case 12, a bracket which is not illustrated and is linked to a body side of the vehicle V is installed.

As illustrated in FIGS. 3 to 7, the airbag 15 includes: a bag main body 16 which inflates by allowing an inflation gas to flow to the inside thereof; and tethers 55, 60L, 60R, 100 and 102 which are disposed in the bag main body 16 and regulate an inflation completion shape of the bag main body 16.

The bag main body 16 is formed in a bag shape formed of a flexible sheet material. In a case of the embodiment, as illustrated in FIGS. 3 to 7, the bag main body 16 includes: a main body inflation portion 17; left side protrusion inflation portion 29 and right side protrusion inflation portion 32 which are disposed to protrude rearward from the rear surface side of the main body inflation portion 17 when the inflation is completed.

Figure 3:
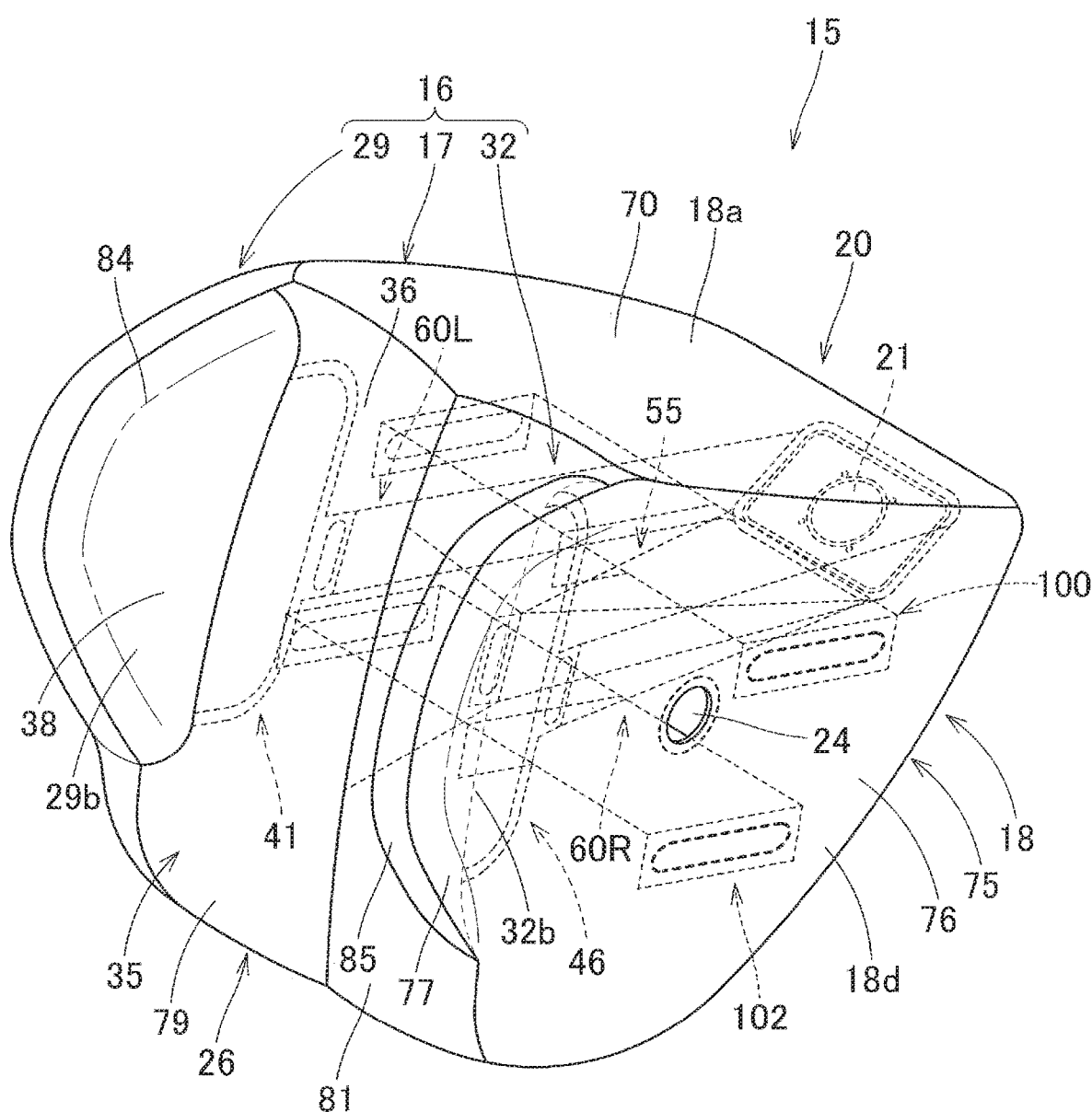
FIG. 3 is a perspective view of a state where an airbag to be used in the airbag device for a passenger seat of the embodiment is inflated as a single body, viewed from an upper right rear side.
Figure 10:
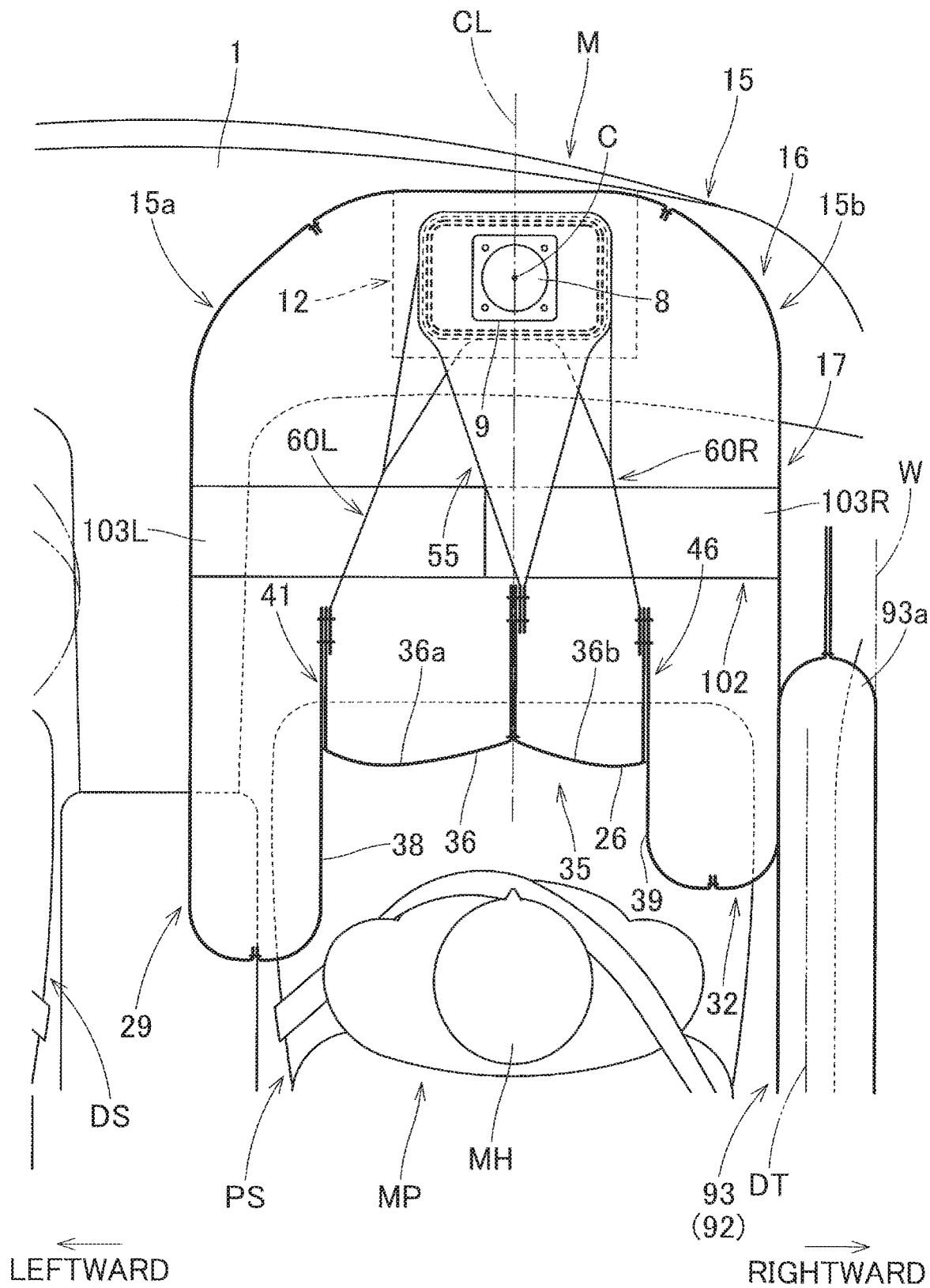
FIG. 10 is a schematic horizontal sectional view illustrating a state where inflation of the airbag is completed, in the airbag device for a passenger seat of the embodiment.

As illustrated by a two-dot chain line of FIG. 1, the main body inflation portion 17 is capable of being disposed to cover between the upper surface 2 of the instrument panel 1 and a windshield 4 above the instrument panel 1 when the inflation is completed. Specifically, as illustrated in FIG. 3, the shape of the main body inflation portion 17 at airbag deployment is a shape of a substantially trigonal prism of which a shaft direction is substantially along the left-right direction, and an attachment portion 20 attached to the case 12 is provided on a front end side when the inflation is completed (refer to FIGS. 3, 4, and 7). In other words, in the airbag 15 of the embodiment, a front end 17a side of the main body inflation portion 17 at airbag deployment is attached to the case 12. In addition, the main body inflation portion 17 is configured to be disposed such that, when the inflation is completed, as illustrated in FIG. 10, a region on the left side to be a driver seat DS side slightly protrudes to the driver seat DS side. The main body inflation portion 17 includes: a rear wall portion 26 disposed on the rear surface side (on an occupant MP side) when the inflation is completed; and a circumferential wall portion 18 having a tapered shape which extends forward from the circumferential edge of the rear wall portion 26 and is restricted such that a width dimension in the up-down direction decreases to the front end side.

The circumferential wall portion 18 is a part disposed to mainly cover the part between the upper surface 2 of the instrument panel 1 and the windshield 4 above the instrument panel 1, when the inflation of the airbag 15 is completed. The circumferential wall portion 18 includes: an upper wall portion 18a and a lower wall portion 18b which are disposed to oppose each other in the up-down direction; and a left wall portion 18c and a right wall portion 18d which are disposed to oppose each other in the left-right direction. In the airbag 15 of the embodiment, a part on the front end side at airbag deployment in the circumferential wall portion 18, is the attachment portion 20 for attaching the airbag 15 to the case 12. In a case of the embodiment, the width dimension of the attachment portion 20 in the left-right direction at airbag deployment is completed is set to be greater than the width dimension in the left-right direction of the case 12. On the lower surface side (the lower wall portion 18b side) at airbag deployment in the attachment portion 20, a gas inflow port 21 formed to be open in a substantially circular shape through which the inflation gas can flow to the inside thereof, and a plurality (four in a case of the embodiment) of attachment holes 22 for inserting the bolt 9a of the retainer 9 thereinto at the circumferential edge of the gas inflow port 21 are formed, and the circumferential edge of the gas inflow port 21 is attached to the bottom wall portion 12a of the case 12. In a case of the embodiment, the gas inflow port 21 is disposed at a position slightly shifted to the right side from the center in the left-right direction of the attachment portion 20. In the embodiment, the airbag 15 is attached to the case 12 and is loaded in the vehicle V considering the center of the gas inflow port 21 as an attachment center C (refer to FIG. 7) such that the attachment center C is identical to the center of the passenger seat PS in the left-right direction (refer to FIG. 10). In addition, vent holes 24 and 24 for exhausting the excessive inflation gas that flows to the inside are formed in the left wall portion 18c and the right wall portion 18d in the circumferential wall portion 18.

When the inflation of the airbag 15 is completed, on the rear surface side which becomes the occupant MP side, the rear wall portion 26 is disposed to be substantially along the up-down direction. In a case of the embodiment, as illustrated by a two-dot chain line of FIG. 2 and in FIG. 4, the rear wall portion 26 is disposed to be slightly inclined with respect to the up-down direction such that the lower end side is shifted to the rear side while being curved along the up-down direction so as to position the center of the up-down direction at the rear side. In addition, the rear wall portion 26 is disposed to be substantially along the left-right direction in a cross sectional view along the front-rear direction when the inflation of the airbag 15 is completed (refer to FIG. 7).

In addition, in a case of the embodiment, the main body inflation portion 17 is configured such that the width in the left-right direction at airbag deployment is substantially constant from the attachment portion 20 on the front end side to the rear surface (rear wall portion 26) side. In other words, the left wall portion 18c and the right wall portion 18d are disposed so as to be substantially along the front-rear direction when the inflation of the main body inflation portion 17 is completed (refer to FIG. 7). In addition, as described above, the airbag 15 of the embodiment is attached to the case 12 and is loaded in the vehicle V considering the center of the gas inflow port 21 disposed at the position shifted to the right side from the center between the left and right sides of the attachment portion 20 as the attachment center C (refer to FIG. 7) such that the attachment center C is identical to the center of the passenger seat PS in the left-right direction. In other words, in a state where the inflation is completed at the time of loading on the vehicle, the main body inflation portion 17 sets the width dimension in the left-right direction (protrusion amount outward on the left and right sides) of the region disposed on the left side (the driver seat DS side) from an attachment center line CL along the front-rear direction passing through the attachment center C to be greater than that of the region disposed on the right side (the exterior of the vehicle remote from the driver seat DS) (refer to FIG. 10). Further, on the left end side and the right end side in the rear wall portion 26 of the main body inflation portion 17, when the inflation of the airbag 15 is completed, the left side protrusion inflation portion 29 (a driver seat side protrusion inflation portion) and the right side protrusion inflation portion 32 (remote side protrusion inflation portion) which inflate so as to protrude rearward from the rear wall portion are disposed.

The left side protrusion inflation portion 29 that serves as a driver seat side protrusion inflation portion is formed at a part on the left end side that becomes the driver seat DS side in the rear wall portion 26, and is disposed at a position which is an obliquely left front side of the occupant MP seated in the passenger seat PS when the inflation of the airbag 15 is completed (refer to FIG. 10). The left side protrusion inflation portion 29 communicates with the main body inflation portion 17 on a front end 29c side at airbag deployment, and is configured to allow the inflation gas to flow to the inside from the main body inflation portion 17 via a communication portion 30 on the front end 29c side (refer to FIG. 10). In addition, an external shape of the left side protrusion inflation portion 29 at airbag deployment is a substantially trapezoidal shape when viewed from the left-right direction side as a shape of a substantial plate disposed such that a thickness direction is along the left-right direction. Specifically, the inflation completed shape when viewed from the left-right direction side of the left side protrusion inflation portion 29 is a trapezoidal shape such that the front end 29c side which is the main body inflation portion 17 side is wide and the width becomes narrow toward a rear end 29d side (refer to FIGS. 3, 5 and 7). The left side protrusion inflation portion 29 is provided with a left wall portion 29a and a right wall portion 29b which are disposed so as to oppose each other in the left-right direction when the inflation is completed. The left wall portion 29a is configured to be continuous from the left wall portion 18c of the circumferential wall portion 18 in the main body inflation portion 17 (refer to FIG. 7). The left side protrusion inflation portion 29 is disposed at a position on the left side of the case 12 when being loaded in the vehicle in a cross section along the front-rear direction when the inflation of the airbag 15 is completed (refer to FIG. 10).

The right side protrusion inflation portion 32 that serves as a remote side protrusion inflation portion is formed at a part on right end side, which is the side away from the driver seat DS, in the rear wall portion 26. When the inflation of the airbag 15 is completed, the right side protrusion inflation portion 32 is disposed at a position that is an obliquely right front part of the occupant MP seated in the passenger seat PS (refer to FIG. 10). Similar to the left side protrusion inflation portion 29, the right side protrusion inflation portion 32 also communicates with the main body inflation portion 17 on a front end 32c side at airbag deployment, and is configured to allow the inflation gas to flow to the inside from the main body inflation portion 17 via a communication portion 33 on the front end 32c side (refer to FIG. 7). In addition, an external shape of the right side protrusion inflation portion 32 when the inflation is completed is a substantially trapezoidal shape when viewed from the left-right direction side as a shape of a substantial plate disposed such that a thickness direction is along the left-right direction (refer to FIGS. 3, 6, and 7). Specifically, the inflation completed shape when viewed from the left-right direction side of the right side protrusion inflation portion 32 is a trapezoidal shape such that the front end 32c side which is the main body inflation portion 17 side is wide and the width becomes narrow toward a rear end 32d side. The right side protrusion inflation portion 32 is provided with a left wall portion 32a and a right wall portion 32b which are disposed so as to oppose each other in the left-right direction when the inflation is completed. The right wall portion 32b is configured to be continuous from the right wall portion 18d of the circumferential wall portion 18 in the main body inflation portion 17 (refer to FIG. 10). The right side protrusion inflation portion 32 is disposed at a position on the right side of the case 12 when being loaded in the vehicle in a cross section along the front-rear direction when the inflation of the airbag 15 is completed (refer to FIG. 10). In addition, when being loaded in the vehicle, the right side protrusion inflation portion 32 is disposed to be in contact with a head protecting airbag 92 which will be described later and inflates to cover a side window W of the passenger seat PS when receiving a head MH of the occupant MP at airbag deployment. Specifically, in a case of the embodiment, the right side protrusion inflation portion 32 is disposed so as to be in contact with the airbag 92 (refer to FIG. 10).

In a case of the embodiment, the left side protrusion inflation portion 29 and the right side protrusion inflation portion 32 are set to have substantially the same outer dimensions except that the protrusion amount from the rear wall portion 26 is made different. Specifically, a width dimension L1 in the up-down direction of the parts on the front ends 29c and 32c at airbag deployment in the left side protrusion inflation portion 29 and the right side protrusion inflation portion 32 is set to be approximately ⅔ of a width dimension L2 in the up-down direction of the part of rear wall portion 26 in the main body inflation portion 17 (refer to FIG. 5). In addition, the lateral width (direction in the left-right direction) L3 of the left side protrusion inflation portion 29 and the right side protrusion inflation portion 32 is set to be approximately ¼ of a width dimension L4 in the left-right direction of the part on the rear end side portion of the main body inflation portion 17 (refer to FIG. 7). Furthermore, a protrusion amount (width dimension L5 in the front-rear direction) from the rear wall portion 26 in the left side protrusion inflation portion 29 is set to be approximately ¼ of a width dimension L6 in the front-rear direction of the main body inflation portion 17 when the inflation is completed (refer to FIG. 7). When the inflation of the airbag 15 is completed, the outer dimension of the left side protrusion inflation portion 29 is brought into contact with the head MH of the occupant MP who moves obliquely leftward and forward in the right wall portion 29b (left side oblique collision restriction surface 38 which will be described later), a dimension by which the head MH of the occupant MP is properly received and the head MH of the occupant MP can be smoothly guided toward a left side restriction recessed portion 41 which will be described later by the right wall portion 29b (left side oblique collision restriction surface 38), is set. Further, in the embodiment, the protrusion amount from the main body inflation portion 17 (rear wall portion 26) at airbag deployment in the right side protrusion inflation portion 32 (remote side protrusion inflation portion) disposed on the right side which is the side away from the driver seat DS is set to be smaller than that of the left side protrusion inflation portion 29 (driver seat side protrusion inflation portion) disposed on the driver seat DS side. Specifically, in the right side protrusion inflation portion 32, the protrusion amount (width dimension L7 in the front-rear direction) (from the rear wall portion 26) at airbag deployment is set to be approximately ⅗ of the protrusion amount (width dimension L5 in the front-rear direction) from the rear wall portion 26 of the left side protrusion inflation portion 29 (refer to FIG. 7).

In other words, in the airbag 15 (bag main body 16) of the embodiment, the main body inflation portion 17 sets the width dimension in the left-right direction (protrusion amount in the left-right direction) of the region disposed on the left side (the driver seat DS side) from an attachment center line CL along the front-rear direction passing through the attachment center C to be greater than that of the region disposed on the right side (the exterior of the vehicle remote from the driver seat DS). In addition, in the airbag 15 (bag main body 16) of the embodiment, the protrusion amount from the main body inflation portion 17 at airbag deployment in the right side protrusion inflation portion 32 is set to be smaller than that of the left side protrusion inflation portion 29. In addition, when the airbag 15 is substantially divided into two in the left-right direction around the attachment center C (center line CL), the capacity of a right side region 15b that serves as a remote side region disposed on the side away from the driver seat DS is set to be smaller than that of the left side region 15a that serves as a driver seat side region disposed on the driver seat DS side. Specifically, in the airbag 15, a width dimension L13 in the left-right direction of the right side region 15b at airbag deployment is set to approximately ⅞ of a width dimension L12 in the left-right direction of the left side region 15a (refer to FIG. 7). In addition, in the airbag 15, the capacity ratio between the left side region 15a and the right side region 15b is set to approximately 8:6 to 8:7 (preferably 8:7).

In addition, in the airbag 15 of the embodiment, the left side protrusion inflation portion 29, the right side protrusion inflation portion 32, and the rear wall portion 26 in the main body inflation portion 17 configure an occupant protection section 35 that can protect the occupant MP when the inflation of the airbag 15 is completed. The occupant protection section 35 includes: a frontal collision restriction surface 36 which can protect the head MH of the occupant MP who moves forward when the frontal collision of the vehicle V occurs; the left side oblique collision restriction surface 38 and the right side oblique collision restriction surface 39 which can protect the head MH of the occupant MP who moves obliquely forward when the oblique collision or the offset collision of the vehicle V occurs; and the left side restriction recessed portion 41 and a right side restriction recessed portion 46 which are respectively installed between the frontal collision restriction surface 36 and each of the left side oblique collision restriction surface 38 and the right side collision restriction surface 39. The left side restriction recessed portion 41 and the right side restriction recessed portion 46 are parts for allowing the head MH of the occupant MP to enter and to be restricted.

In a case of the embodiment, the frontal collision restriction surface 36 is configured with the upper region of the rear wall portion 26 and is configured with a region disposed between the left side protrusion inflation portion 29 and the right side protrusion inflation portion 32 in the airbag 15 when the inflation is completed. The frontal collision restriction surface 36 has a width dimension in the left-right direction so as to be capable of protecting the head MH of the occupant MP who moves forward when the frontal collision occurs without any trouble. In addition, in the embodiment, the airbag 15 has the front-and-rear tether 55 which will be described on the inside thereof, and the frontal collision restriction surface 36 is configured such that the position on the attachment center line CL that links the front-and-rear tether 55 is slightly recessed toward the front side at airbag deployment in a cross section substantially along the front-rear direction (refer to FIG. 7). In addition, in the airbag 15 of the embodiment, as described above, the main body inflation portion 17 sets the width dimension in the left-right direction (protrusion amount in the left-right direction) of the region disposed on the left side (the driver seat DS side) from the attachment center line CL along the front-rear direction passing through the attachment center C to be greater than that of the region disposed on the right side (the exterior of the vehicle remote from the driver seat DS). In other words, at airbag deployment the frontal collision restriction surface 36 is configured such that a length dimension in the left-right direction at a left side part 36a that serves as a driver seat side part disposed on the driver seat DS side (left side) from the front-and-rear tether 55, is greater than that of a right side part 36b that serves as the remote side part disposed on the remote side (right side) away from the driver seat DS from the front-and-rear tether 55. Specifically, in a case of the embodiment, a width dimension (length dimension) L8 in the left-right direction of the right side part 36b is set to be approximately ¾ of a width dimension L9 in the left-right direction side of the left side part 36a (refer to FIG. 7). The width dimension in the left-right direction of the right side part 36b is set to be a dimension by which the large interference with the head protecting airbag 92 which inflates to cover the window W is suppressed and the right side protrusion inflation portion 32 can be smoothly disposed, when the inflation of the airbag 15 is completed.

The left side oblique collision restriction surface 38 disposed on the left side which is the driver seat DS side is configured with the right wall portion 29b of the left side protrusion inflation portion 29. The right side oblique collision restriction surface 39 disposed on the right side which the side away from the driver seat DS is configured with the left wall portion 32a of the right side protrusion inflation portion 32. In addition, in the embodiment, as described above, the protrusion amount of the right side protrusion inflation portion 32 from the rear wall portion 26 at airbag deployment is set to be smaller than that of the left side protrusion inflation portion 29. In other words, the length dimension in the front-rear direction of the right side oblique collision restriction surface 39 is set to be smaller than that of the left side oblique collision restriction surface 38. In addition, the left side oblique collision restriction surface 38 and the right side oblique collision restriction surface 39 are disposed substantially along the front-rear direction when the inflation of the airbag 15 is completed (refer to FIG. 7). In addition, in the airbag 15 of the embodiment, the region on the lower side in the rear wall portion 26 mainly receives a chest portion of the occupant MP when the head MH of the occupant MP who moves forward is restricted by the occupant protection section 35 when the frontal collision, the oblique collision, or the offset collision occurs.

Figure 5:
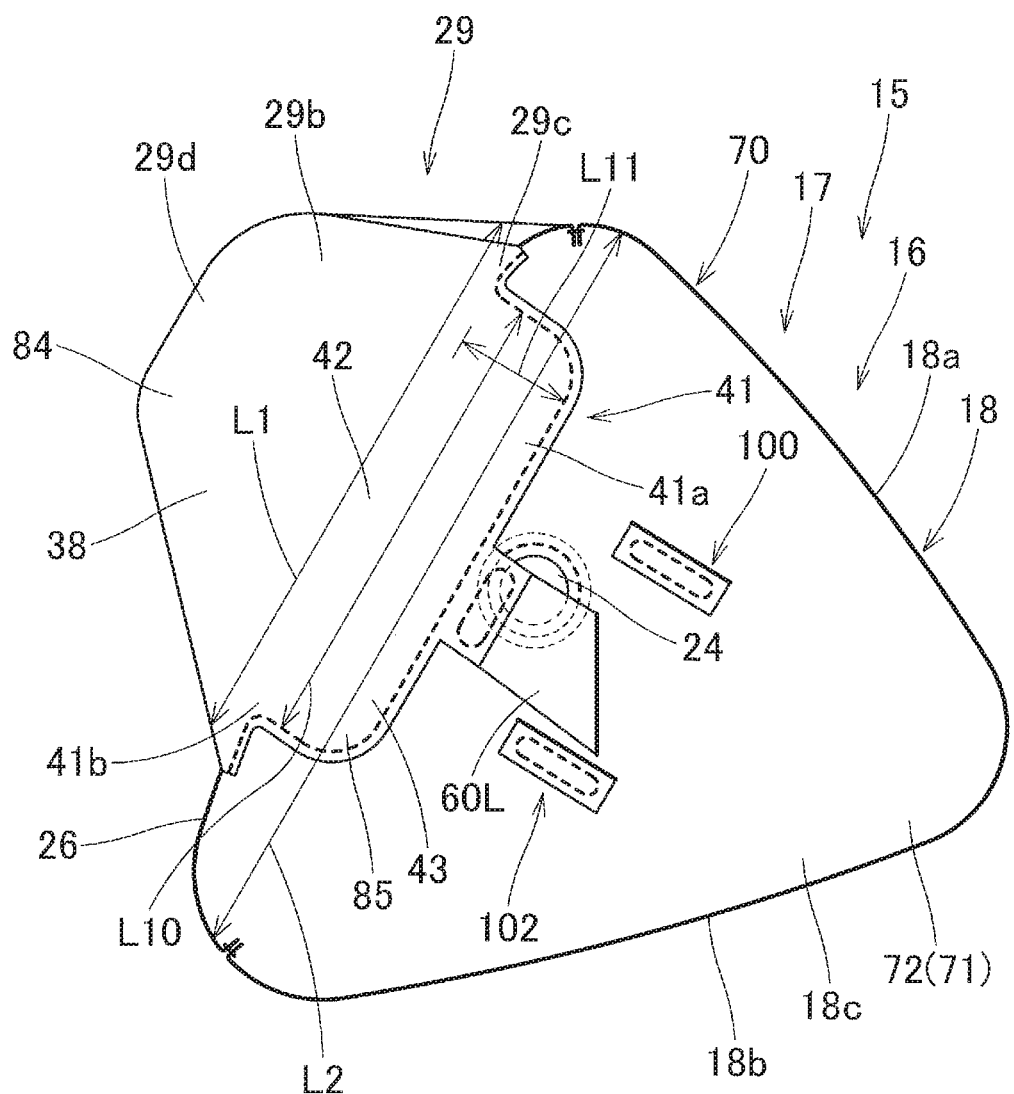
FIG. 5 is a schematic vertical sectional view of the airbag of FIG. 3, and is a sectional view at a part of a left side restriction recessed portion.
Figure 7:
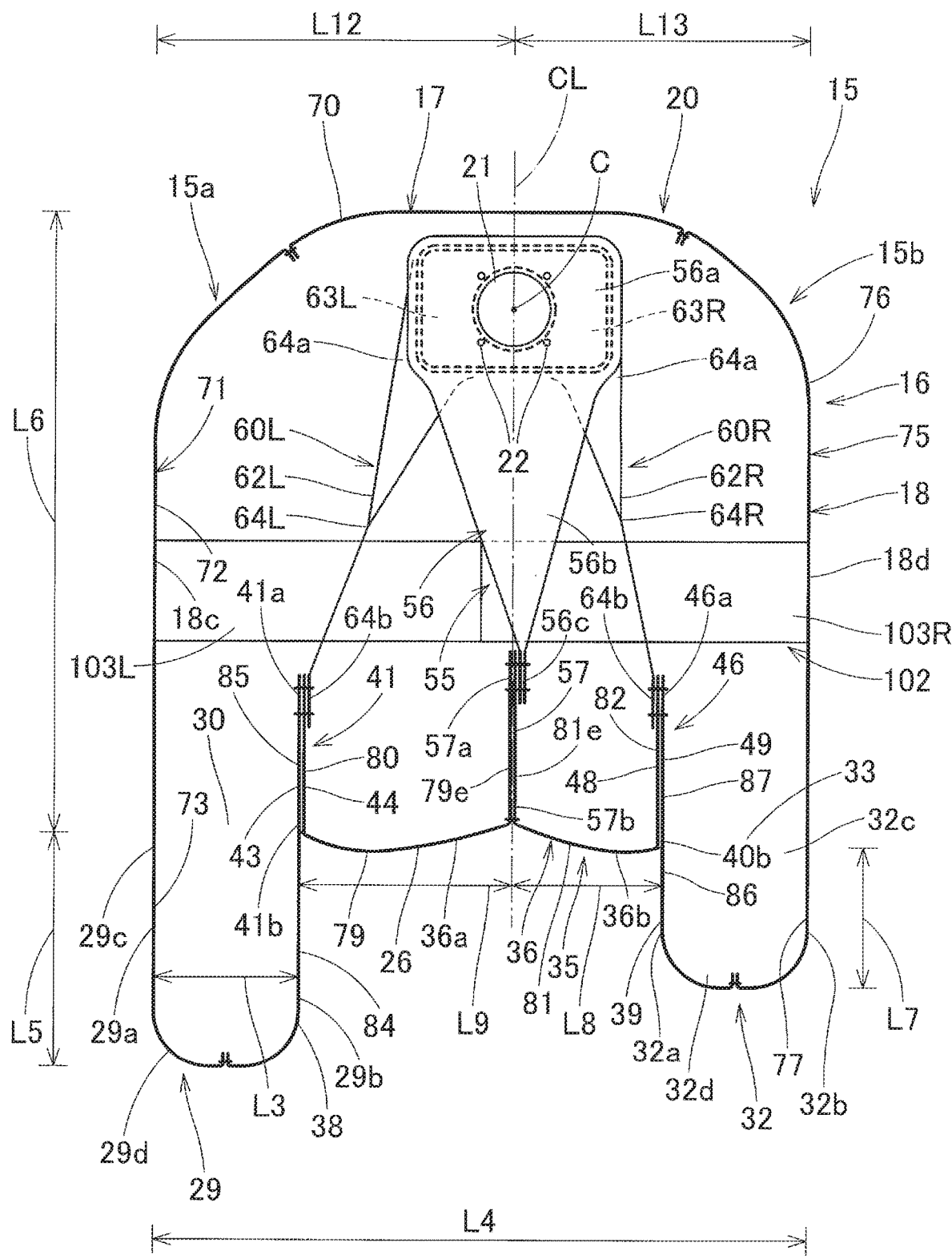
FIG. 7 is a schematic horizontal sectional view of the airbag of FIG. 3.

The left side restriction recessed portion 41 formed between the frontal collision restriction surface 36 and the left side oblique collision restriction surface 38 is for restraining to enter the head MH of the occupant MP who moves obliquely leftward and forward. In a case of the embodiment, the left side restriction recessed portion 41 is formed at a boundary part between the region on the right side of the left side protrusion inflation portion 29 and the rear wall portion 26 in the main body inflation portion 17 to be substantially along the up-down direction, and as illustrated in FIGS. 5 and 7, the left side restriction recessed portion 41 is recessed forward in a shape of a pocket by opening a rear end 41b side. In other words, the left side restriction recessed portion 41 is formed on a left edge side of the frontal collision restriction surface 36. Specifically, the left side restriction recessed portion 41 is configured in a shape of a substantial pocket in which the rear end 41b side is open by coupling (sewing) each of upper edges, lower edges, and front edges of the substantially rectangular left side wall 43 and a right side wall 44 which are wide in the up-down direction when viewed from the left-right direction side (refer to FIG. 5). In other words, the width dimension in the up-down direction of the left side restriction recessed portion 41 is constant to a front end 41a side (a tip end side of a recess).

Figure 6:
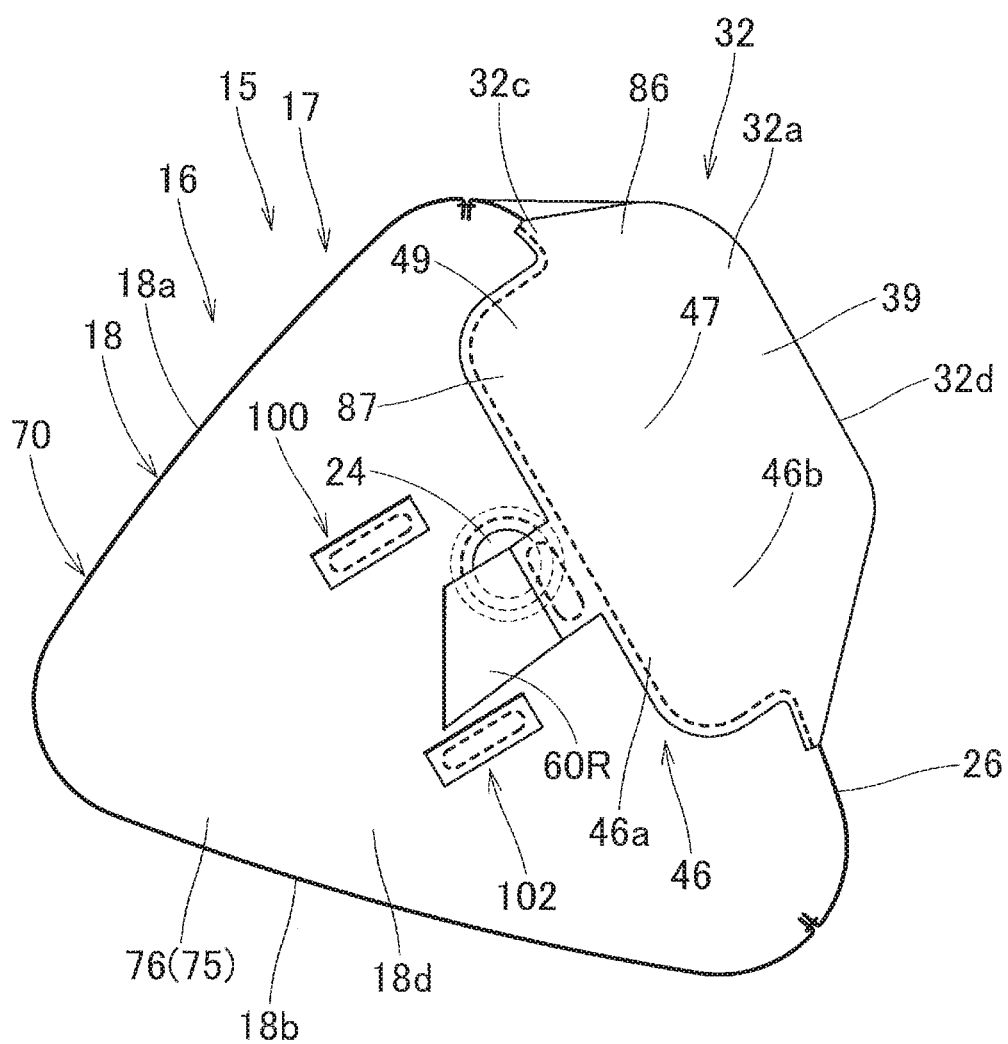
FIG. 6 is a schematic vertical sectional view of the airbag of FIG. 3, and is a sectional view at a part of a right side restriction recessed portion.

The right side restriction recessed portion 46 formed between the frontal collision restriction surface 36 and the left side oblique collision restriction surface 39 is for restraining to enter the head MH of the occupant MP who moves obliquely leftward and forward. In a case of the embodiment, the right side restriction recessed portion 46 is formed at a boundary part between the region on the left side of the right side protrusion inflation portion 32 and the rear wall portion 26 in the main body inflation portion 17 to be substantially along the up-down direction, and as illustrated in FIGS. 6 and 7, the right side restriction recessed portion 46 is recessed forward in a shape of a pocket by opening a rear end 46b side. In other words, the right side restriction recessed portion 46 is formed on a right edge side of the frontal collision restriction surface 36. Specifically, the right side restriction recessed portion 46 is configured in a shape of a substantial pocket in which the rear end 46b side is open by coupling (sewing) each of upper edges, lower edges, and front edges of a substantially rectangular left side wall 48 and a right side wall 49 which are wide in the up-down direction when viewed from the left-right direction side (refer to FIG. 6). In other words, the width dimension in the up-down direction of the right side restriction recessed portion 46 is constant to a front end 46a side (a tip end side of a recess).

In a case of the embodiment, the left side restriction recessed portion 41 and the right side restriction recessed portion 46 are configured to have substantially the same outer shape. The length dimension (the opening width dimension of an opening 42) in the up-down direction of each of the left side restriction recessed portion 41 and the right side restriction recessed portion 46 is set to be a dimension by which the head MH of the occupant MP can smoothly enter. Specifically, a length dimension L10 (opening width dimension of the opening 42) in the up-down direction of the left side restriction recessed portion 41 and the right side restriction recessed portion 46 is set to be smaller than the width dimension L1 in the up-down direction of the part on the front ends 29c and 32c side of the left side protrusion inflation portion 29 and the right side protrusion inflation portion 32, and is set to be approximately 400 mm (refer to FIG. 5). In addition, a width dimension (depth) L11 in the front-rear direction of the left side restriction recessed portion 41 and the right side restriction recessed portion 46 is set to be a dimension by which the region on the front side of the head MH of the occupant MP can enter. Specifically, the width dimension (depth) L11 in the front-rear direction of the left side restriction recessed portion 41 and the right side restriction recessed portion 46 is set to be approximately 50 to 100 mm (refer to FIG. 5). The left side restriction recessed portion 41 and the right side restriction recessed portion 46 are disposed such that the left side protrusion inflation portions 29 and the right side protrusion inflation portion 32 are substantially identical to the center between the upper and lower sides, respectively.

Further, in the airbag 15 of the embodiment, the left side restriction recessed portion 41 and the right side restriction recessed portion 46 are respectively disposed in a state where tip end (front ends 41a and 46a) side of the recess is linked to the recessed portion tethers 60L and 60R disposed in the bag main body 16, and the tip end (front ends 41a and 46a side) of the recess are pulled by the recessed portion tethers 60L and 60R when the inflation of the airbag 15 is completed (refer to FIG. 7). In a case of the embodiment, the left side restriction recessed portion 41 is disposed to be substantially along the front-rear direction so as to bring the left side wall 43 and the right side wall 44 into contact with each other across substantially the entire region when the inflation of the airbag 15 is completed, and so as to be continuous from the right wall portion 29b of the left side protrusion inflation portion 29 in a state where the opening 42 on the rear end 41b side is suppressed from being open. Similarly, the right side restriction recessed portion 46 is also disposed to be substantially along the front-rear direction so as to bring the left side wall 48 and the right side wall 49 into contact with each other across substantially the entire region, and so as to be continuous from the left wall portion 32a of the right side protrusion inflation portion 32 in a state where an opening 47 on the rear end 46b side is suppressed from being open.

In the bag main body 16, as illustrated in FIGS. 4 to 7, the tethers 55, 60L, 60R, 100 and 102 are disposed. Specifically, the front-and-rear tether 55, the left-and right tethers 100, 102, and the recessed portion tethers 60L and 60R are disposed in the region of the main body inflation portion 17.

The front-and-rear tether 55 links the position which is a slightly right side from the center in the left-right direction of the frontal collision restriction surface 36 and the front end 17a side of the airbag 15 (main body inflation portion 17) to each other. Specifically, as illustrated in FIG. 7, the front-and-rear tether 55 is disposed so as to be positioned on the center line CL when the inflation of the airbag 15 is completed. The front-and-rear tether 55 is configured to link a front side part 56 which extends from the circumferential edge of the gas inflow port 21 and a rear side part 57 which extends from the rear wall portion 26 side to each other (refer to FIG. 4).

Figure 4:
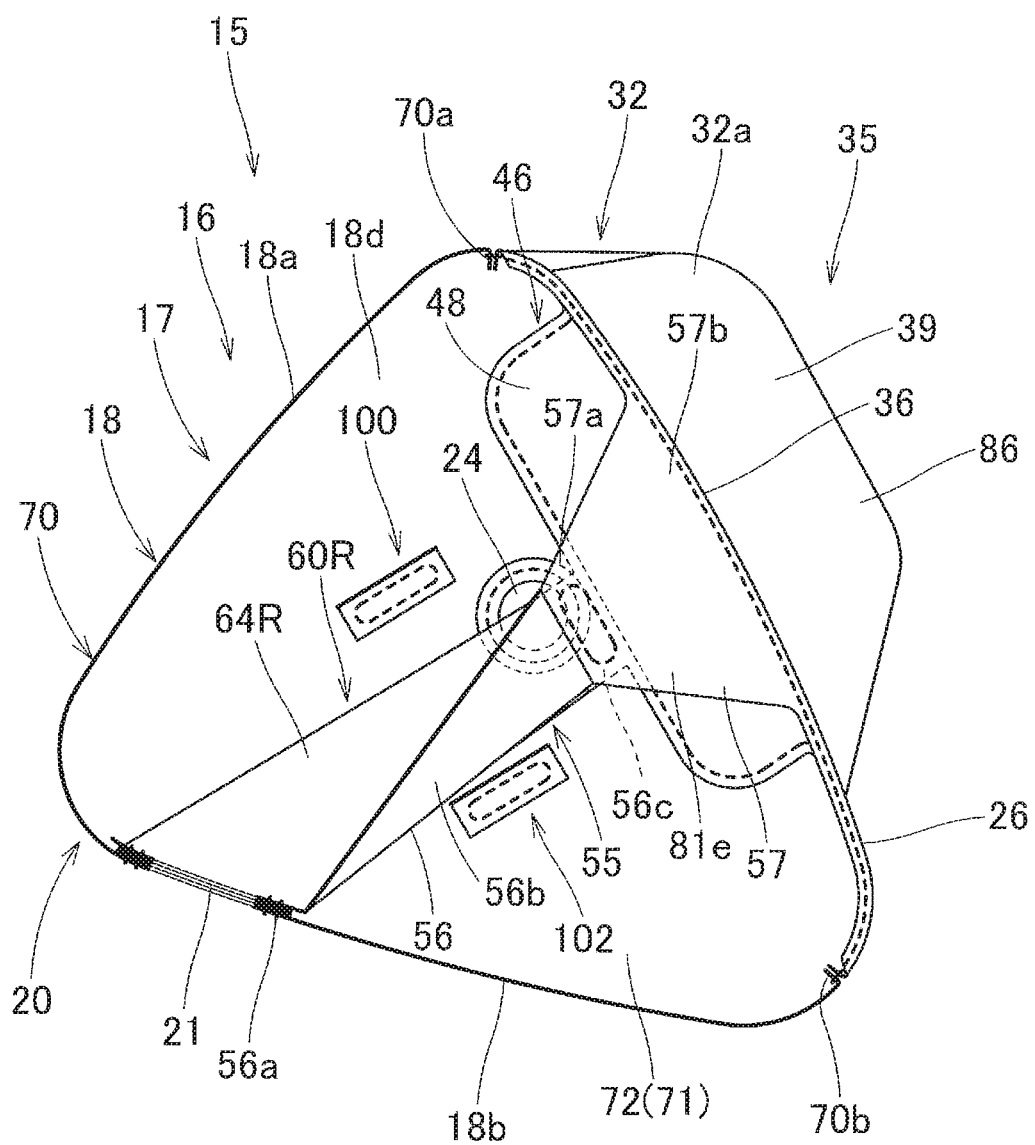
FIG. 4 is a schematic vertical sectional view of the airbag of FIG. 3, and is a sectional view at a part of a front-and-rear tether.
Figure 8:
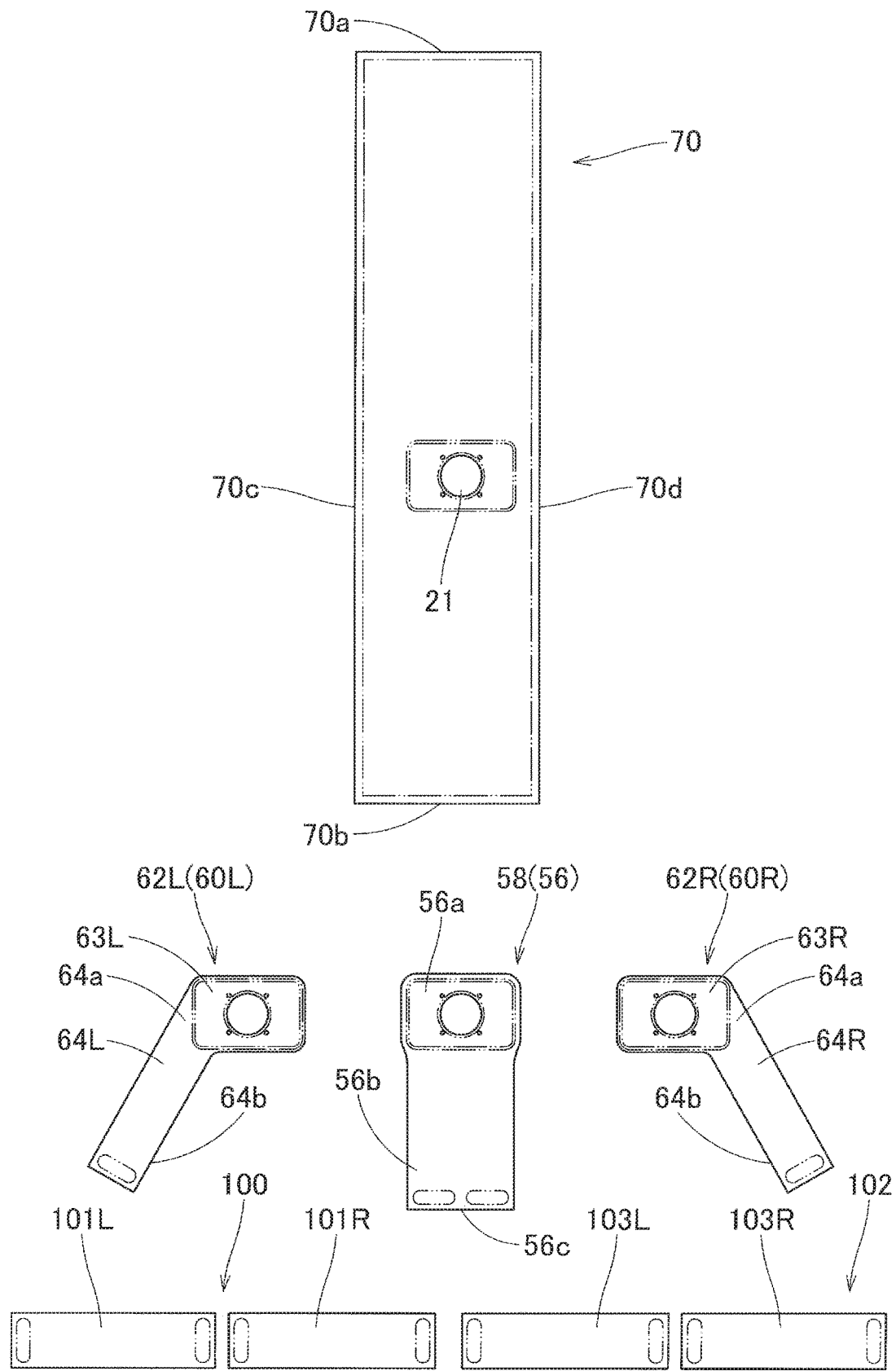
FIGS. 8 and 9 are plan views illustrating base fabric which configures the airbag of the embodiment.

The front side part 56 is disposed to extend from the circumferential edge of the gas inflow port 21, and in a case of the embodiment, the front side part 56 is configured by folding a front side part base material 58 illustrated in FIG. 8. The front side part 56 has a laterally symmetric shape, and has a three-dimensional shape which is similar to a shape of a substantially triangular pyramid by allowing the front end side to be substantially along the left-right direction and the rear end side to be substantially along the up-down direction at airbag deployment. The front side part base material 58 has a belt-like shape in which the longitudinal direction is along the front-rear direction. In a case of the embodiment, as illustrated in FIGS. 4 and 7, considering the region on the front end side as a linking portion 56a to the bag main body 16, openings (not illustrated) which correspond to the gas inflow port 21 and the attachment hole 22 are disposed in the linking portion 56a, and the front side part 56 is sewed at the part on the lower surface side of the attachment portion 20 in the main body inflation portion 17 at a circumferential edge part of the gas inflow port 21. In addition, at the front side part 56, the region which extends rearward from the gas inflow port 21 configures a main body portion 56b, and the outer shape of the main body portion 56b is a three-dimensional shape which is similar to a shape of a substantially triangular pyramid (refer to FIG. 4). In the main body portion 56b, a width dimension in the up-down direction of a part on a rear end 56c side is substantially identical to a width dimension in the up-down direction of a part on a front end 57a side at the rear side part 57.

Figure 9:
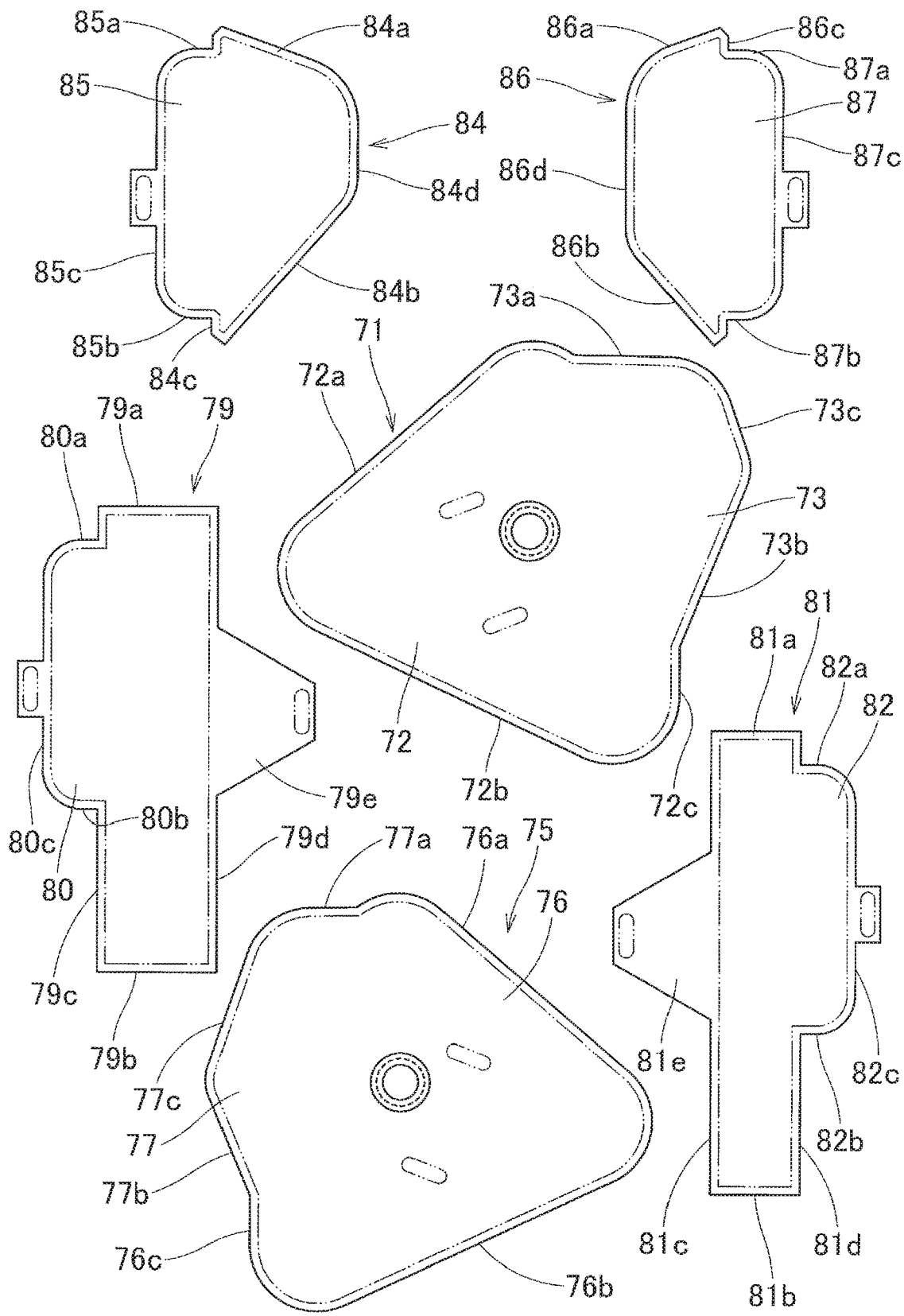

In a case of the embodiment, the rear side part 57 is configured with extending portions 79e and 81e which extend from a right edge 79d of a rear left panel 79 and a left edge 81c of a rear right panel 81 configuring the rear wall portion 26 in the main body inflation portion 17, and are configured to be integrated with the rear left panel 79 and the rear right panel 81 (refer to FIGS. 7 and 9). In other words, the rear side part 57 is formed in a two-layered shape overlapped in the left-right direction. Specifically, in a case of the embodiment, the rear side part 57 has a substantially trapezoidal shape in which the front end 57a side linked to the front part 56 is narrow and widens in the up-down direction to a rear end 57b side. Further, in a case of the embodiment, the rear side part 57 is linked to a position that is substantially at the center between the upper and lower sides of the rear wall portion 26.

When the inflation of the airbag 15 is completed, the front-and-rear tether 55 regulates a distance between a part intersecting with the center line CL in the rear wall portion 26 (protection center for protecting the occupant MP when the frontal collision occurs), and a circumferential edge part of the gas inflow port 21. In other words, the front-and-rear tether 55 links the frontal collision restriction surface 36 and the front end 17a side of the airbag 15 (main body inflation portion 17) to each other. The front-and-rear tether 55 is disposed to suppress excessive rearward protrusion of the frontal collision restriction surface 36 in the initial stage of inflation of the airbag 15 and rearward movement of the frontal collision restriction surface 36 when the inflation is completed. In addition, in the embodiment, the rear wall portion 26 is installed to be pulled by the front-and-rear tether 55, and when the inflation of the airbag 15 is completed, the position that is on the center line CL is slightly recessed toward the front side of the vehicle across the entire region in the up-down direction (refer to FIG. 7).

Each of the left-and-right tethers 100 and 102 is disposed generally along a left and right direction and connects the left wall portion 18c and right wall portion 18d of the main body inflation portion 17 inside the bag body 16 as inflated. In the illustrated embodiment, as shown in FIGS. 3 to 6, the left-and-right tethers 100 and 102 are disposed at two positions above and below the front-and-rear tether 55. As shown in FIGS. 4 to 6, each of the upper left-and-right tether 100, which is located above the front-and-rear tether 55, and the lower left-and-right tether 102, which is located below the front-and-rear tether 55, is formed into a band, and is deployable in such a manner that the length direction extends generally along a horizontal direction. In the illustrated embodiment, each of the left-and-right tethers 100 and 102 is formed by jointing a pair of tethering base fabrics 101L and 101R/103L and 103R in a serial fashion in a left and right direction, as shown in FIG. 8. The left-and-right tethers 100 and 102 are provided for limiting a clearance between left wall portion 18c and right wall portion 18d of the main body inflation portion 17.

As illustrated in FIG. 7, when the inflation of the airbag 15 is completed, each of the recessed portion tethers 60L and 60R are respectively disposed to link the tip ends sides (front ends 41a and 46a side) of the recesses of the left side restriction recessed portion 41 and the right side restriction recessed portion 46 to the front end 17a side of the airbag 15, and in a case of the embodiment, it is substantially bilaterally symmetrical. Each of the recessed portion tethers 60L, 60R is configured with tethering base fabric 62L and 62R shown in FIG. 8. Each of the tethering base fabric 62L and 62R includes belt-like main body portions 64L and 64R, linking portions 63L and 63R formed so as to protrude inward in the left-right direction on the front end 64a side of the main body portions 64L and 64R. In addition, each of the recessed portion tethers 60L and 60R is configured to couple (sew) the circumferential edge of the gas inflow port 21 with the linking portions 63L and 63R on the front end side of the tethering base fabric 62L and 62R to overlap each other, and to link rear ends 64b side of the main body portions 64L and 64R extending both from the left and right sides of the gas inflow port 21 to the front ends 41a and 46a side of each of the left side restriction recessed portion 41 and the right side restriction recessed portion 46. In addition, each of the recessed portion tethers 60L and 60R is disposed to be inclined with respect to the front-rear direction such that the rear end 64b faces the outer side in the left-right direction at airbag deployment. Each of the recessed portion tethers 60L and 60R sets the length dimension such that the left side restriction recessed portion 41 and the right side restriction recessed portion 46 which are disposed substantially along the front-rear direction can be respectively pulled forward when the inflation of the airbag 15 is completed.

The bag main body 16 is configured in a bag shape by coupling the circumferential edges of the base fabric having a predetermined shape to each other, and in a case of the embodiment, as illustrated in FIGS. 8 and 9, the bag main body 16 is configured of seven pieces of base fabric including a front panel 70 disposed on the front side when the inflation is completed, a left panel 71 disposed on the left side when the inflation is completed, a right panel 75 disposed on the right side when the inflation is completed, a rear left panel 79 and a rear right panel 81 which are disposed on the rear side when the inflation is completed, a left side protrusion portion panel 84 that configures the right wall portion 29b of the left side protrusion inflation portion 29, and a right side protrusion portion panel 86 that configures the left wall portion 32a of the right side protrusion inflation portion 32.

The front panel 70 has a substantially belt-like outer shape of which the longitudinal direction is substantially along the front-rear direction, and configures a region from the upper wall portion 18a to the lower wall portion 18b in the main body inflation portion 17 at airbag deployment. In the front panel 70, the gas inflow port 21 and the attachment hole 22 are formed. The gas inflow port 21 is disposed so as to shift the center slightly to the right side from the center in the width direction of the front panel 70.

The left panel 71 configures the part from the left wall portion 18c in the main body inflation portion 17 to the left wall portion 29a of the left side protrusion inflation portion 29. As illustrated in FIG. 9, the left panel 71 has a substantially triangular main body portion 72 that configures the region of the left wall portion 18c of the main body inflation portion 17, and a substantially trapezoidal protrusion portion 73 that protrudes from the rear end side of the main body portion 72. The protrusion portion 73 is a part that configures the left wall portion 29a of the left side protrusion inflation portion 29. The right panel 75 configures the part from the right wall portion 18d in the main body inflation portion 17 to the right wall portion 32b of the right side protrusion inflation portion 32. As illustrated in FIG. 9, the right panel 75 has a substantially triangular main body portion 76 that configures the region of the right wall portion 18d of the main body inflation portion 17, and a substantially trapezoidal protrusion portion 77 that protrudes from the rear end side of the main body portion 76. The protrusion portion 77 is a part that configures the right wall portion 32b of the right side protrusion inflation portion 32. The main body portion 76 of the right panel 75 has substantially the same outer shape as that of the main body portion 72 of the left panel 71. The protrusion amount from the main body portion 76 in the protrusion portion 77 formed on the right panel 75 is set to be smaller than the protrusion amount from the main body portion 72 in the protrusion portion 73 of the left panel 71.

The rear left panel 79 and the rear right panel 81 are configured to divide the part of the rear wall portion 26 in the main body inflation portion 17 in the left-right direction. The rear left panel 79 and the rear right panel 81 are respectively formed in a belt shape in which the longitudinal direction is substantially along the up-down direction. In a case of the embodiment, the width dimension of the rear right panel 81 is set to be slightly smaller than that of the rear left panel 79. The extending portions 79e and 81e that configure the rear side part 57 of the front-and-rear tether 55 are respectively formed at the right edge 79d of the rear left panel 79 and the left edge 81c of the rear right panel 81. On the upper end side of the left edge 79c of the rear left panel 79, a recessed portion part 80 that configures the right side wall 44 of the left side restriction recessed portion 41 is formed so as to partially protrude. On the upper end side of a right edge 81d of the rear right panel 81, a recessed portion part 82 that configures the left side wall 48 of the right side restriction recessed portion 46 is formed so as to partially protrude.

The left side protrusion portion panel 84 configures the right wall portion 29b in the left side protrusion inflation portion 29, and has a substantially trapezoidal shape of which the outer shape is substantially the same as the outer shape of the protrusion portion 73 of the left panel 71. At a front edge 84c of the left side protrusion portion panel 84, a recessed portion part 85 that configures the left side wall 43 of the left side restriction recessed portion 41 is formed so as to protrude.

The right side protrusion portion panel 86 configures the left wall portion 32a in the right side protrusion inflation portion 32, and has a substantially trapezoidal shape of which the outer shape is substantially the same as the outer shape of the protrusion portion 77 of the right panel 75. At a front edge 86c of the right side protrusion portion panel 86, a recessed portion part 87 that configures the right side wall 49 of the right side restriction recessed portion 46 is formed so as to protrude.

In the embodiment, the front panel 70, the left panel 71, the right panel 75, the rear left panel 79, the rear right panel 81, the left side protrusion portion panel 84, the right side protrusion portion panel 86 which configure the bag main body 16, the front part base material 58 that configures the front part 56 of the front-and-rear tether 55, the tethering base fabric 101L, 101R/103L, 103R that configure the left-and-right tethers 100 and 102, and the tethering base fabric 62L and 62R that configure the recessed portion tethers 60L and 60R, are respectively formed of a flexible woven fabric made of a polyester yarn, a polyamide yarn or the like.

In addition, as illustrated in FIGS. 3 to 9, the bag main body 16 of the embodiment has a shape of a bag by sewing (coupling) the corresponding edges of the front panel 70, the left panel 71, the right panel 75, the rear left panel 79, the rear right panel 81, the left side protrusion portion panel 84, and the right side protrusion portion panel 86 to each other by using the suture thread. Specifically, a rear upper edge 70a of the front panel 70 is coupled to the upper edges 79a and 81a of the rear left panel 79 and the rear right panel 81. A rear lower edge 70b is coupled to the lower edges 79b and 81b of the rear left panel 79 and the rear right panel 81. A left edge 70c of the front panel 70 is coupled from an upper edge 72a to a lower edge 72b of the main body portion 72 in the left panel 71. A right edge 70d of the front panel 70 is coupled from an upper edge 76a to a lower edge 76b of the main body portion 76 in the right panel 75. The left edge 79c of the rear left panel 79 is coupled to the rear edge 72c of the main body portion 72 in the left panel 71 and the front edge 84c of the left side protrusion portion panel 84. The right edge 79d of the rear left panel 79 is coupled to the left edge 81c of the rear right panel 81. The right edge 81d of the rear right panel 81 is coupled to a rear edge 76c of the main body portion 76 in the right panel 75 and a front edge 86c of the right side protrusion portion panel 86. An upper edge 73a, a lower edge 73b, and a rear edge 73c of the protrusion portion 73 in the left panel 71 are respectively coupled to an upper edge 84a, a lower edge 84b, and a rear edge 84d of the left side protrusion portion panel 84. An upper edge 80a, a lower edge 80b, and a front edge 80c of the recessed portion part 80 formed in the rear left panel 79 are respectively coupled to an upper edge 85a, a lower edge 85b, and a front edge 85c of the recessed portion part 85 formed in the left side protrusion portion panel 84. An upper edge 77a, a lower edge 77b, and a rear edge 77c of the protrusion portion 77 in the right panel 75 are respectively coupled to an upper edge 86a, a lower edge 86b, and a rear edge 86d of the right side protrusion portion panel 86. An upper edge 82a, a lower edge 82b, and a front edge 82c of the recessed portion part 82 formed in the rear right panel 81 are respectively coupled to an upper edge 87a, a lower edge 87b, and a front edge 87c of the recessed portion part 87 formed in the right side protrusion portion panel 86.

Figure 11:
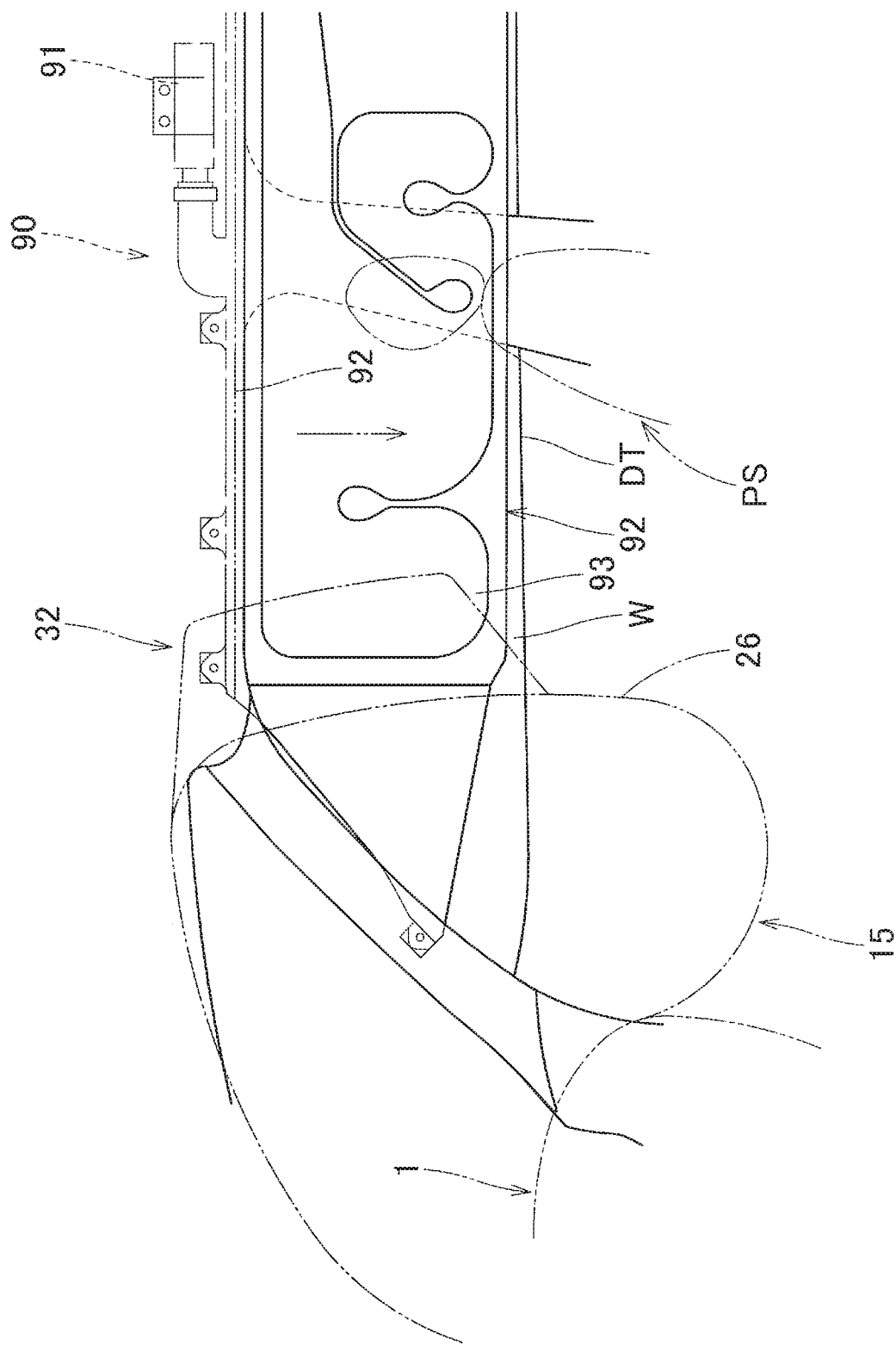
FIG. 11 is a schematic side view illustrating a state where the airbag of the head protection airbag device disposed on a side of the passenger seat is inflated in the vehicle on which the airbag device for a passenger seat of the embodiment is loaded.

In addition, in the vehicle V in which the airbag device M for a passenger seat of the embodiment is loaded, as illustrated in FIG. 11, a head protecting airbag device 90 is loaded on the upper edge side of the side window W of the passenger seat PS. The head protecting airbag device 90 includes: a head protecting airbag (hereinafter, referred to as "airbag") 92 folded and stored on the upper edge side of the window W; an inflator 91 which supplies the inflation gas to the airbag 92. Although the detailed illustration is omitted, the airbag 92 is formed in a shape of a bag formed of a flexible sheet material, but the airbag 92 is folded by roll folding so as to wind from the lower edge side to the outside of the vehicle, and is stored on the upper edge side of the window W. In addition, when the inflator 91 is in operation, the airbag 92 inflates to cover the interior side of the window W as illustrated in FIGS. 10 and 11 by allowing the inflation gas from the inflator 91 to flow to the inside. Specifically, the head protecting airbag 92 is configured such that a front end 93a of an inflation portion 93 that inflates by allowing the inflation gas to flow to the inside is disposed at a position that is a front side from the rear wall portion 26 in the airbag 15 in a state of being viewed from the up-down direction side (refer to FIG. 10). When the inflation is completed, the inflation portion 93 is disposed to abut against the right protrusion inflation portion 32 so as to cover the interior of the vehicle of the window W while covering the exterior side of the right side protrusion inflation portion 32 between the airbag 15 and the window W. In addition, in the embodiment, similar to the inflator 8 of the airbag device M for a passenger seat, the inflator 91 of the head protecting airbag device 90 is configured to operate when the frontal collision, the oblique collision, and the offset collision of the vehicle V occur.

Next, loading of the airbag device M for a passenger seat of the embodiment in the vehicle V will be described. First, the airbag 15 is folded so as to be storable in the case 12 in a state where the retainer 9 is stored in the inside thereof, and the periphery of the folded airbag 15 is wrapped by a wrapping sheet (not illustrated) which can be broken so as not to collapse. Next, the folded airbag 15 is placed in the bottom wall portion 12a of the case 12. The main body portion 8a of the inflator 8 is inserted into the case 12 from below the bottom wall portion 12a, and the bolts 9a of the retainer 9 which protrudes downward from the bottom wall portion 12a is inserted into the flange portion 8c of the inflator 8. After this, when the nut 10 is fastened to each of the bolts 9a which protrude from the flange portion 8c of the inflator 8, the folded airbag 15 and the inflator 8 can be attached to the case 12.

In the airbag device M for a passenger seat of the embodiment, in a state of being loaded in the vehicle V, when the frontal collision, the oblique collision, or the offset collision of the vehicle V occurs, if the inflation gas is discharged from the gas discharge port 8b of the inflator 8, the airbag 15 inflates by allowing the inflation gas to flow to the inside, and the door portions 6a and 6b of the airbag cover 6 are pressed and open. In addition, the airbag 15 protrudes upward from the case 12 via an opening formed by pressing and opening the door portions 6a and 6b of the airbag cover 6, is developed and inflated while protruding toward the rear of the vehicle, and completes the inflation to cover the part between the upper surface 2 of the instrument panel 1 and the windshield 4 above the instrument panel 1 as illustrated by two-dot chain line of FIGS. 1 and 2, and FIG. 10. In addition, at this time, the head protecting airbag 92 also completes the inflation to cover the interior side of the window W on the passenger seat side by allowing the inflation gas to flow to the inside (refer to the two-dot chain line of FIG. 1, and FIGS. 10 and 11). As described above, since the airbag 92 is folded by roll folding so as to wind from the lower edge side to the vehicle outer side, even when a gap between the inflating airbag 15 and the window W is narrow, it is possible to smoothly enter the narrow gap.

Figure 12:
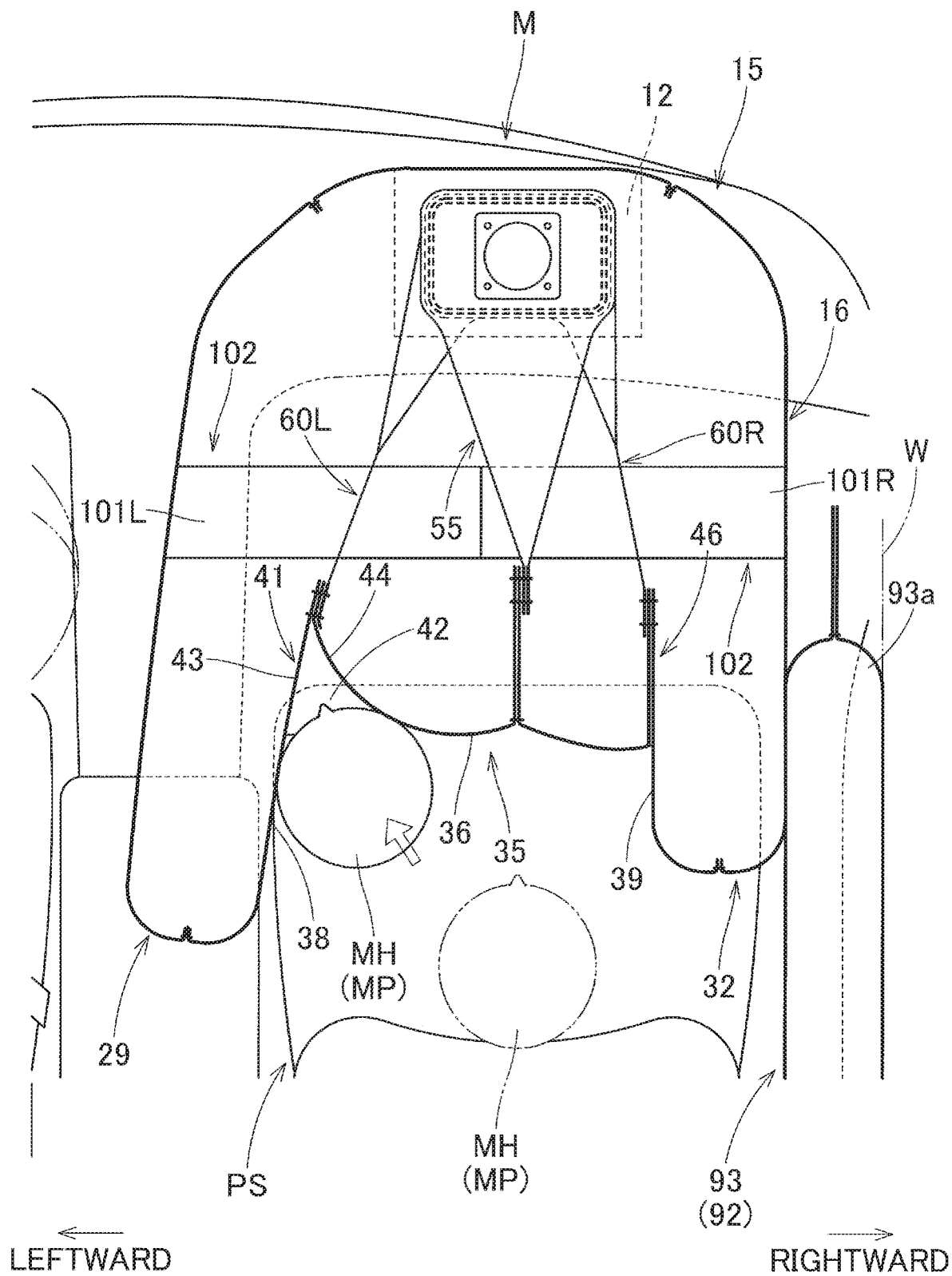
FIG. 12 is a schematic horizontal sectional view illustrating a state where the airbag which has been inflated receives an occupant who moves obliquely leftward and forward, in the airbag device for a passenger seat of the embodiment.
Figure 13:
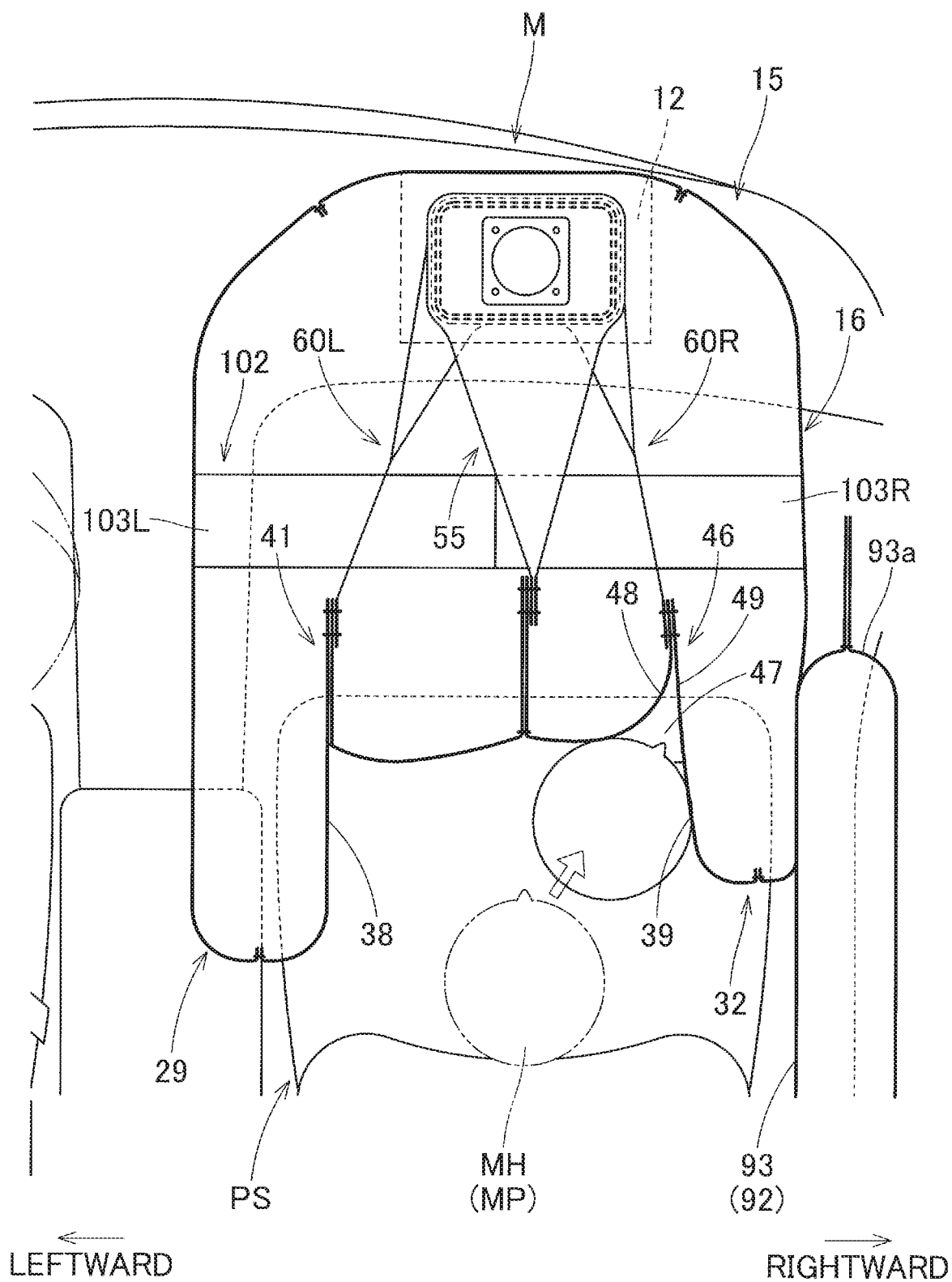
FIG. 13 is a schematic horizontal sectional view illustrating a state where the airbag which has been inflated receives an occupant who moves obliquely rightward and forward, in the airbag device for a passenger seat of the embodiment.

In addition, in the airbag device M for a passenger seat of the embodiment, even when the occupant protection section 35 of the airbag 15 includes the left side oblique collision restriction surface 38 and the right side oblique collision restriction surface 39 both on the left and right sides of the frontal collision restriction surface 36, the airbag 15 is configured to set the capacity of the right side region 15b that serves as the remote side region disposed on the side (right side) away from the driver seat DS to be smaller than that of the left side region 15a that serves as the driver seat side region disposed on the driver seat DS side (left side), when the inflation is completed. In other words, in the airbag device M for a passenger seat of the embodiment, in the region on the driver seat DS side on which an inflation space is wide, that is, on which there is no obstruction, by largely inflating the part (left side region 15a) at which the left side oblique collision restriction surface 38 is provided, it is possible to properly receive the head MH of the occupant MP who moves obliquely leftward and forward on the driver seat DS side by the left side oblique collision restriction surface 38. In addition, in the embodiment, the inflation of the head protecting airbag 92 is completed to cover the side window W of the passenger seat PS in the region on the right side remote from the driver seat DS where there is little margin in the inflation space, but it is possible to dispose the right side region 15b of which the capacity is set to be smaller than that of the left side region 15a without any trouble by suppressing interference with the airbag 92 that inflates in this manner. In addition, even when the capacity of the right side region 15b is set to be small, on the right side remote from the driver seat DS in the passenger seat PS, as illustrated in FIGS. 10 and 11, the head protecting airbag 92, the window W, or a door trim DT is disposed to be close to the right side region 15b (remote side region). Therefore, by the right side oblique collision restriction surface 39 on the right side region 15b (remote side region) which is in a state of being supported by the airbags 92 and the like, it is possible to receive the head MH of the occupant MP who moves obliquely forward on the exterior side (right side) of the vehicle remote from the driver seat DS without any trouble. Further, in the airbag device M for a passenger seat of the embodiment, in the occupant protection section 35 of the airbag 15, between the frontal collision restriction surface 36 and each of the left side oblique collision restriction surface 38 and the right side oblique collision restriction surface 39, the left side restriction recessed portion 41 and the right side restriction recessed portion 46 which are recessed forward are installed. When the inflation of the airbag 15 is completed, each of the left side restriction recessed portion 41 and the right side restriction recessed portion 46 is properly maintained in the recessed state respectively by the recessed portion tethers 60L and 60R linked to the front end 17a side of the airbag 15. In addition, the recessed portion tethers 60L and 60R can also prevent the front-rear movement (front-rear swinging) of the left side restriction recessed portion 41 and the right side restriction recessed portion 46 when the airbag 15 is developed and inflated. Therefore, the left side restriction recessed portion 41 and the right side restriction recessed portion 46 can be quickly disposed at a predetermined position, and it is possible to properly receive the head MH of the occupant MP who moves obliquely forward (obliquely leftward and forward) on the driver seat DS side or obliquely forward (obliquely rightward and forward) on the exterior of the vehicle away from the driver seat DS by allowing the head MH to enter the left side restriction recessed portion 41 and the right side restriction recessed portion 46, respectively (refer to FIGS. 12 and 13).

Therefore, in the airbag device M for a passenger seat of the embodiment, even when the left side oblique collision restriction surface 38 and the right side oblique collision restriction surface 39 are provided both on the left and right sides of the frontal collision restriction surface 36, it is possible to quickly inflate the airbag 15 and to properly protect the head MH of the occupant MP.

Further, in the airbag device M for a passenger seat of the embodiment, the airbag 15 includes the main body inflation portion 17; and left side protrusion inflation portion 29 and right side protrusion inflation portion 32 which are disposed to protrude rearward from the rear surface side of the inflated main body inflation portion 17 and to be separated from each other in the left-right direction. The frontal collision restriction surface 36 is configured with the rear surface (rear wall portion 26) of the inflated main body inflation portion 17, and in each of the left side protrusion inflation portion 29 and the right side protrusion inflation portion 32, the left side oblique collision restriction surface 38 and the right side oblique collision restriction surface 39 are respectively configured of the right wall portion 29b and the left wall portion 32a which are disposed to protrude rearward from the rear surface of the main body inflation portion 17 when the inflation is completed. Therefore, when the inflation of the airbag 15 is completed, it is possible to receive the head MH of the occupant MP who moves obliquely forward by the left side oblique collision restriction surface 38 and the right side left side oblique collision restriction surface 39 which are disposed to protrude rearward from the left side restriction recessed portion 41 and the right side restriction recessed portion 46, and to guide the head MH to the left side restriction recessed portion 41 and the right side restriction recessed portion 46 side by moving the head MH forward along the left side oblique collision restriction surface 38 and the right side oblique collision restriction surface 39. As a result, when the oblique collision or the offset collision of the vehicle V occurs, it is possible to receive the head MH of the occupant MP who moves obliquely forward by the left side restriction recessed portion 41 and the right side restriction recessed portion 46 more stably. If such an advantageous effect does not have to be considered, as an airbag, an airbag which does not include the protrusion inflation portion and includes the occupant protection portion and in which each of the oblique collision restriction surfaces is disposed substantially on the same surface as the frontal collision restriction surface with the restriction recessed portion therebetween, may be used.

Specifically, in the airbag 15 of the embodiment, the protrusion amount from the main body inflation portion 17 at airbag deployment in the right side protrusion inflation portion 32 that serves as the remote side protrusion inflation portion disposed on the side remote from the driver seat DS is set to be smaller than that of the left side protrusion inflation portion 29 that serves as the driver seat side protrusion inflation portion disposed on the driver seat DS side. In the vehicle V in which the airbag device M for a passenger seat of the embodiment is loaded, the head protecting airbag device 90 including the airbag 92 which inflates to cover the side window W of the passenger seat PS, is loaded, and the head protecting airbag device 90 is also configured to operate when the airbag device M for a passenger seat is in operation. In other words, when the inflation of the airbag 15 is completed, the head protecting airbag 92 inflates between the right side protrusion inflation portion 32 and the window W, and it is possible to receive the head MH of the occupant MP who moves obliquely rightward and forward by the head protecting airbag 92 via the right side protrusion inflation portion 32 (refer to FIG. 13). Therefore, by setting the protrusion amount from the main body inflation portion 17 of the right side protrusion inflation portion 32 to be small, it is possible to further prevent interference with the airbag 92 and the like, and even in a configuration in which the protrusion amount of the right side protrusion inflation portion 32 is set to be small, it is possible to properly receive the head MH of the occupant MP who moves obliquely rightward and forward by the right side protrusion inflation portion 32. Incidentally, the internal pressure when the inflation is completed in the airbag 15 is approximately 5 to 15 kPa, and is set to be smaller than the internal pressure (approximately 30 kPa) when the inflation is completed in the head protecting airbag 92. When the right side protrusion inflation portion 32 receives the head MH of the occupant MP, the airbag 92 supports the exterior (right side) of the right side protrusion inflation portion 32 in a state where the head MH of the occupant MP is received, and the head MH of the occupant MP is in a state of being received by the airbag 92 via the right side protrusion inflation portion 32 (refer to FIG. 13). In addition, in the embodiment, the airbag 15 is configured so as to make the right side protrusion inflation portion 32 abut against the head protecting airbag 92 when the inflation is completed, but the right side protrusion inflation portion may be configured not to be in contact with the head protecting airbag when the inflation is completed, and may be configured to be in contact with the head protecting airbag when the head of the occupant is received.

In the airbag device M for a passenger seat of the embodiment, the airbag 15 has the recessed portion tethers 60L and 60R which link the tip ends (front ends 41a and 46a) side of the recesses of each of the left side restriction recessed portion 41 and the right side restriction recessed portion 46 and the front end 17a side of the airbag 15 to each other, installed on the inside thereof. In other words, in the airbag 15, when the inflation is completed, the positions which are the vicinity of both of the left and right ends of the frontal collision restriction surface 36 are respectively linked to the front end 17a side of the airbag 15 by the recessed portion tethers 60L and 60R through the left side restriction recessed portion 41 and the right side restriction recessed portion 46. Therefore, when the airbag 15 is developed and inflated, excessive rearward protrusion of both the left and right edge sides of the frontal collision restriction surface 36 of the airbag 15 that protrudes from the case 12 as the storage part can be regulated by the recessed portion tethers 60L and 60R. As a result, even with the airbag 15 configured such that the left side protrusion inflation portion 29 and the right side protrusion inflation portion 32 partially protrude rearward, it is possible to quickly inflate the airbag 15 with excellent balance on the left and right sides.

Figure 19:
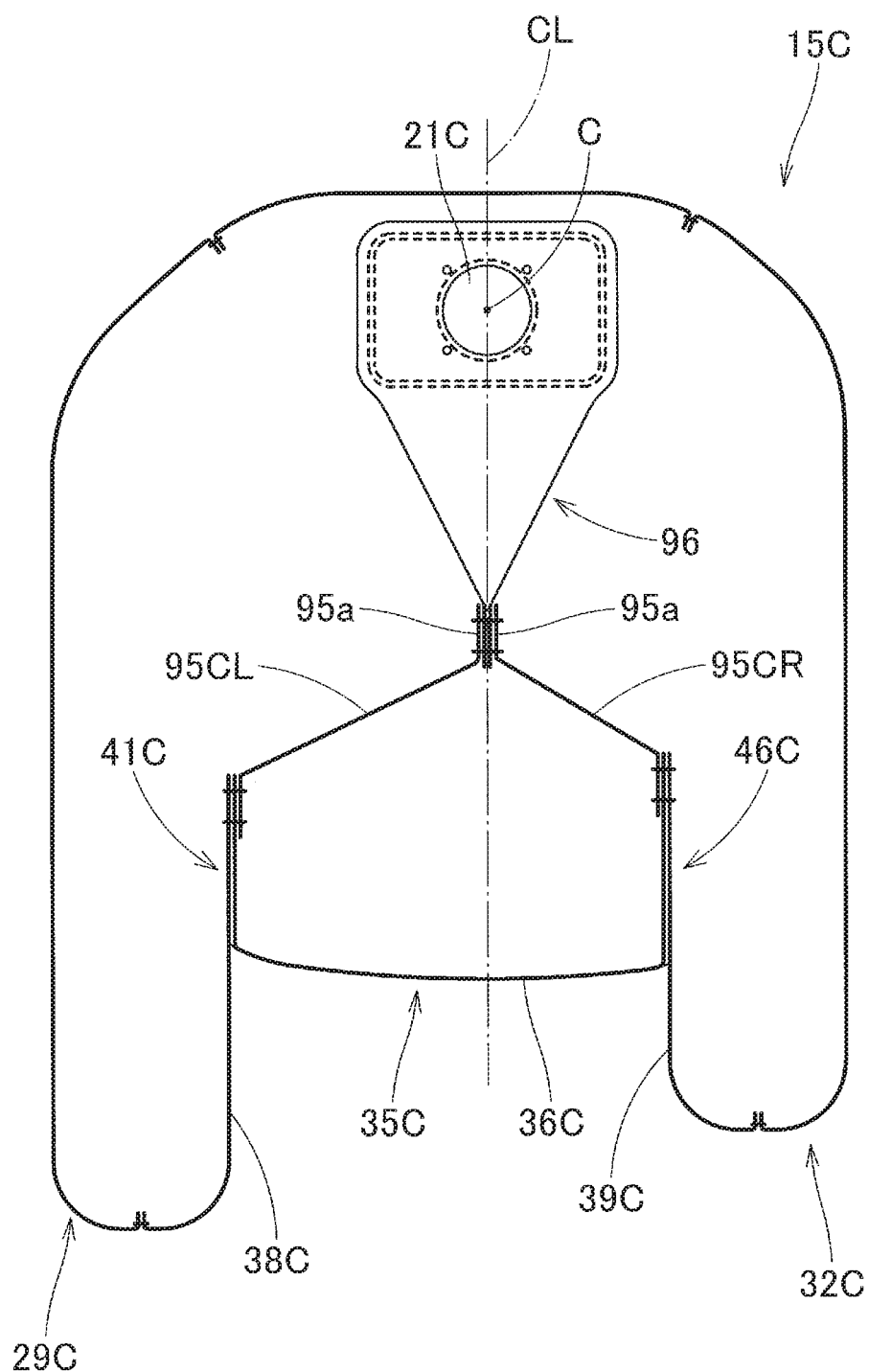
FIG. 19 is a schematic horizontal sectional view of a state where an airbag of still another embodiment of the invention is inflated as a single body.

Furthermore, in the airbag device M for a passenger seat of the embodiment, on the inside of the airbag 15, the front-and-rear tether 55 which links the frontal collision restriction surface 36 and the front end 17a side of the airbag 15 to each other and can suppress the rearward movement of the frontal collision restriction surface 36 at airbag deployment, is installed to extend rearward from the attachment center C and substantially along the front-rear direction. In addition, in the frontal collision restriction surface 36, the length dimension (width dimension) in the left-right direction when the inflation is completed at the left side part 36a that serves as the driver seat side part disposed on the driver seat DS side from the front-and-rear tether 55, is set to be greater than that of the right side part 36b that serves as the remote side part disposed on the remote side away from the driver seat DS from the front-and-rear tether 55. Therefore, in the airbag device M for a passenger seat of the embodiment, since the front-and-rear tether 55 is provided, when the inflation of the airbag 15 is completed, it is possible to suppress the rearward movement of the frontal collision restriction surface 36, and to smoothly arrange the frontal collision restriction surface 36 to face the front of the occupant MP. In addition, it is also possible to suppress a case where the frontal collision restriction surface 36 inflates to excessively protrude rearward in the initial stage of the inflation of the airbag 15. If such an advantageous effect does not have to be considered, as an airbag, an airbag in which the front-and-rear tether is not disposed on the inside thereof similar to an airbag 15A illustrated in FIGS. 14 and 15 or an airbag 15C illustrated in FIG. 19, may be used.

Figure 14:
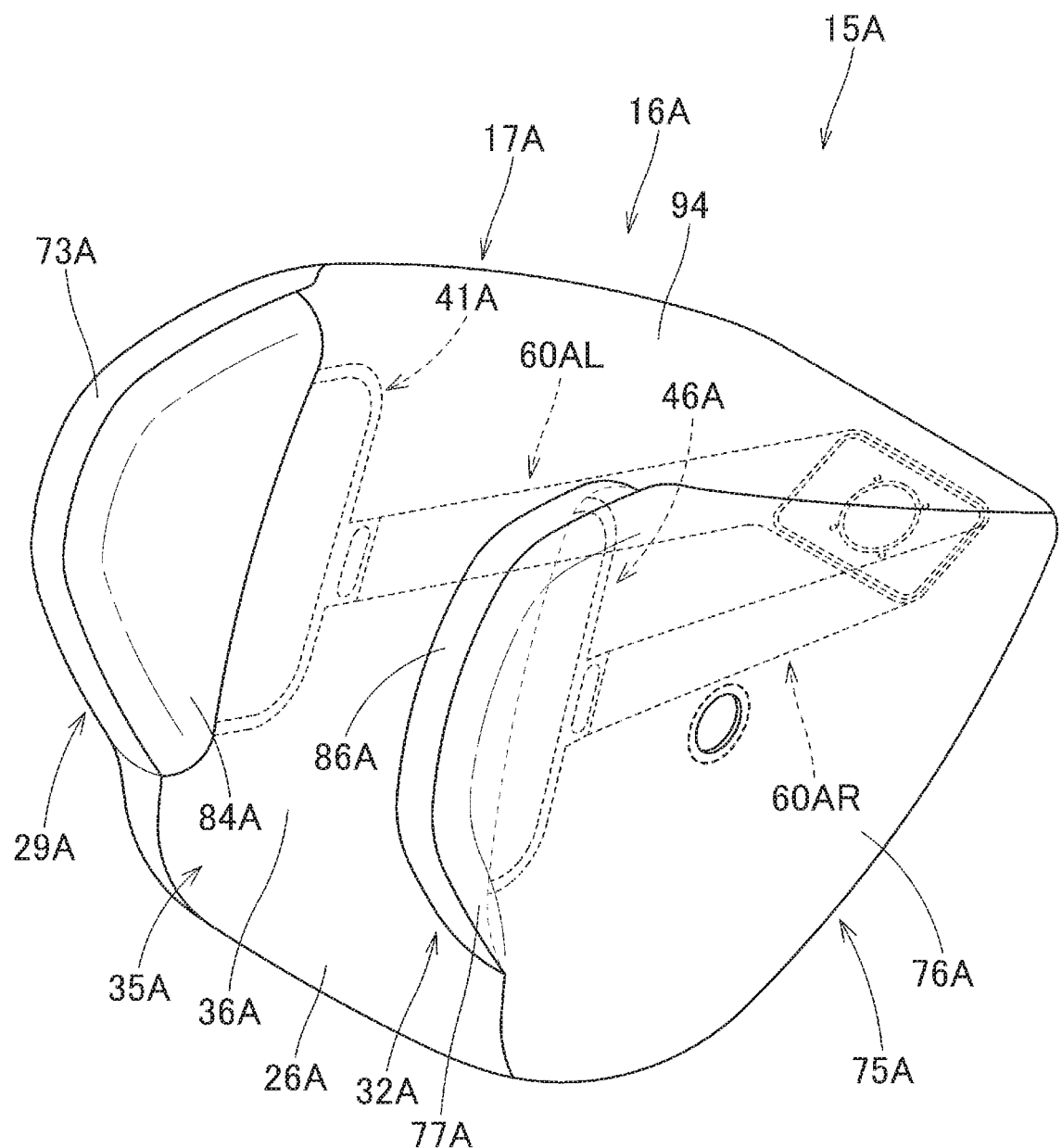
FIG. 14 is a perspective view illustrating a state where an airbag of another embodiment of the invention is inflated as a single body and a state viewed from an upper right rear side.
Figure 15:
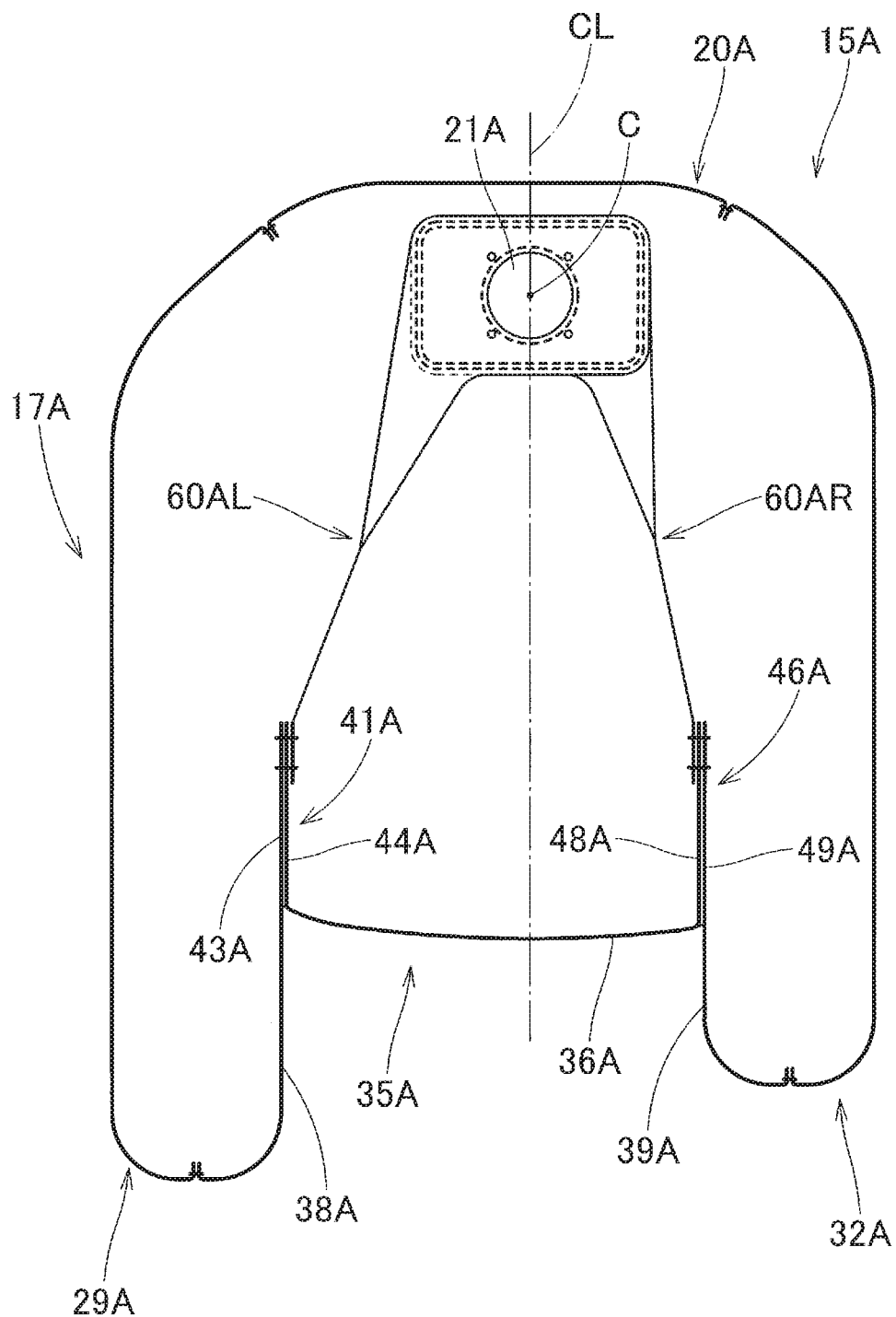
FIG. 15 is a schematic horizontal sectional view of the airbag of FIG. 14.
Figure 16:
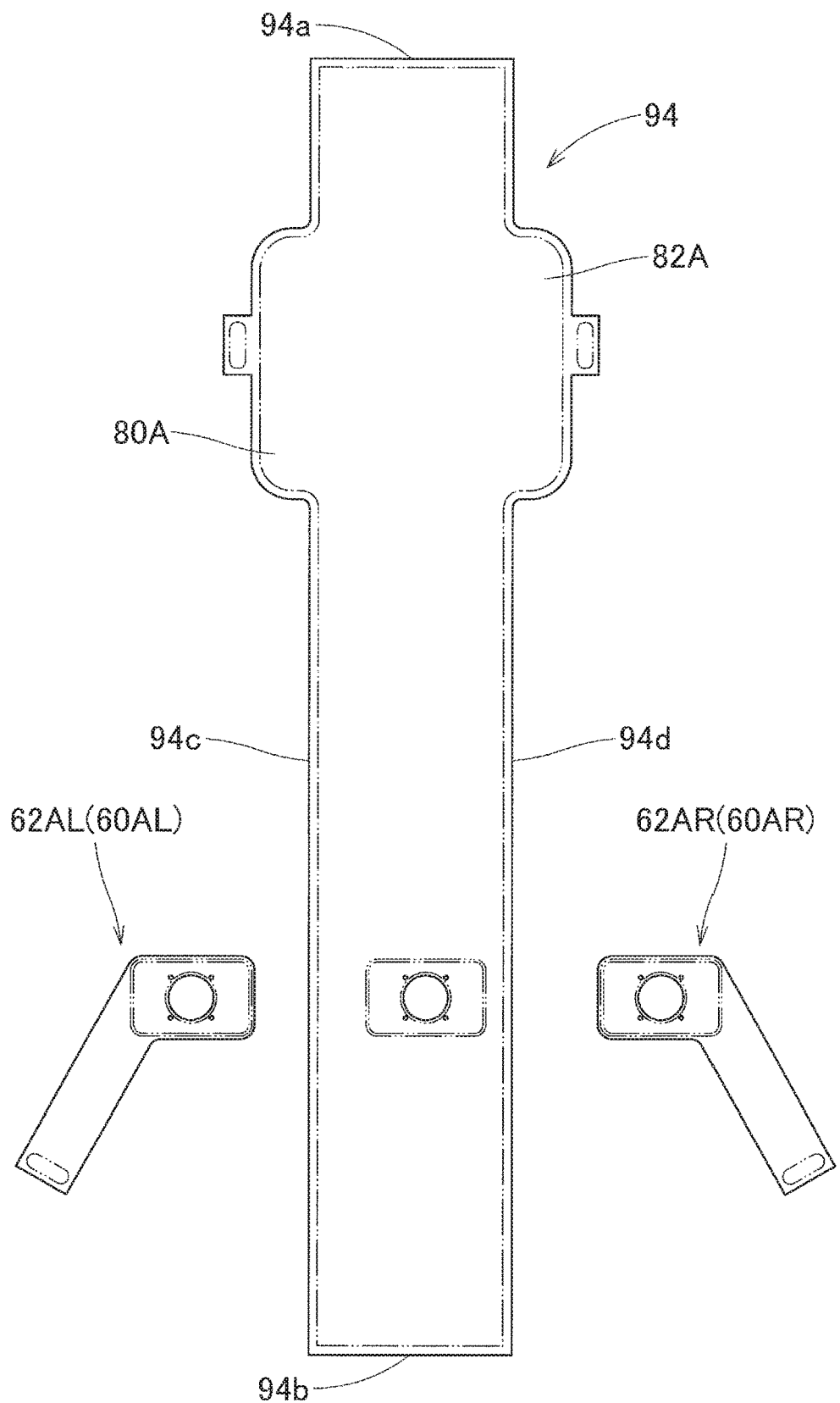
FIGS. 16 and 17 are plan views illustrating base fabric which configures the airbag of FIG. 14.
Figure 17:
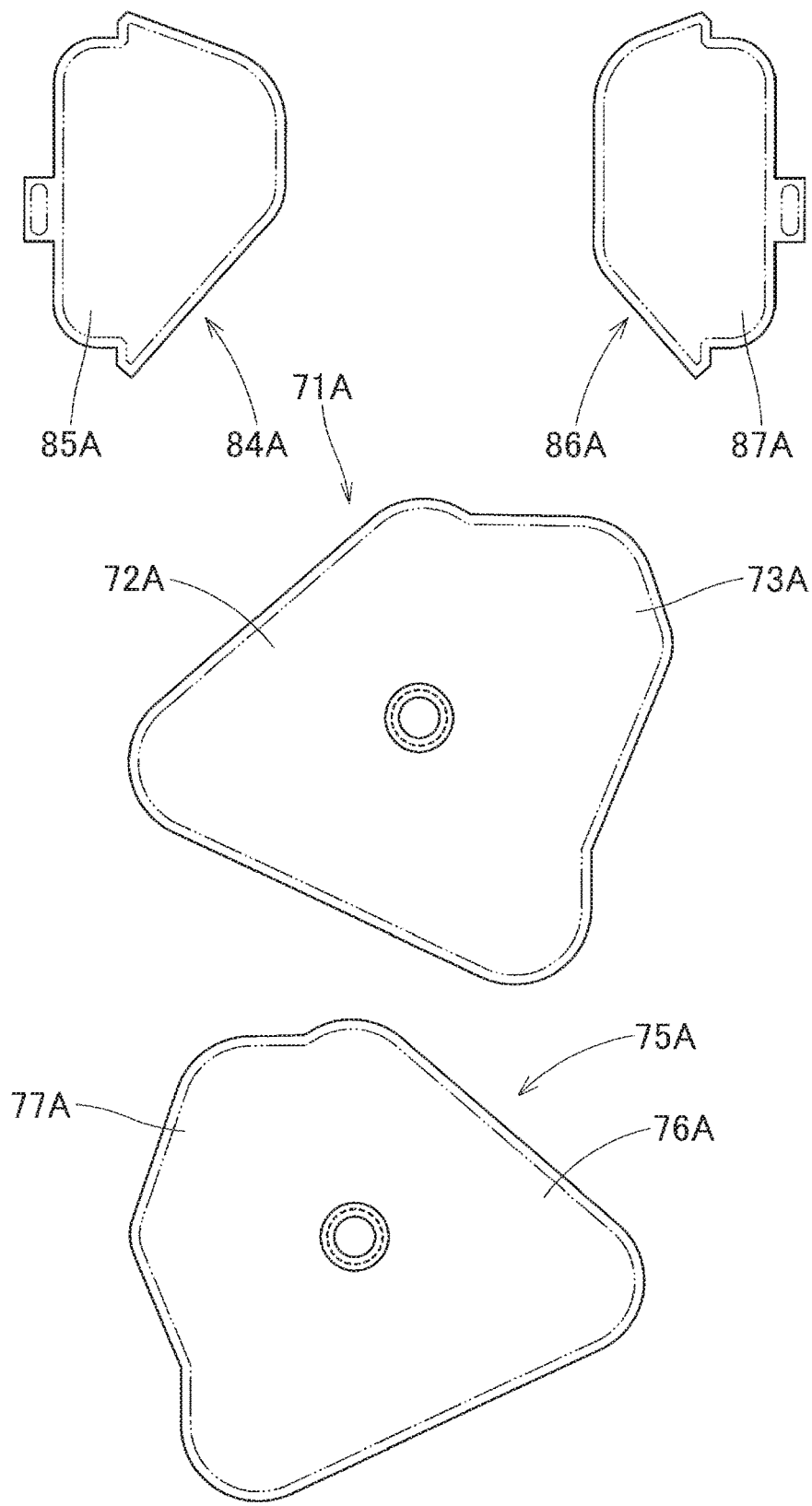

The airbag 15A illustrated in FIGS. 14 and 15 has the same configuration as that of the above-described airbag 15, except that the front-and-rear tether is not provided. Therefore, with respect to the same member, "A" will be given at the end of the same reference numerals, and the specific description thereof will be omitted. In the airbag 15A, as illustrated in FIGS. 16 and 17, the bag main body 16A is configured of five pieces of base fabric including a main panel 94, a left panel 71A, a right panel 75A, a left side protrusion portion panel 84A, and a right side protrusion portion panel 86A. The main panel 94 is configured to have a substantially belt-like outer shape of which the longitudinal direction is substantially along the front-rear direction, and configures a region from the upper wall portion 18a to the lower wall portion 18b through a rear wall portion 26A in the main body inflation portion 17 when the inflation is completed. In a case of the embodiment, although not illustrated in detail, the main panel 94 is configured such that the short sides 94a and 94b are coupled to each other in the vicinity of the boundary part between the rear wall portion 26A and the lower wall portion 18b. On the left edge 94c side of the main panel 94, a recessed portion part 80A that configures the right side wall 44A of the left side restriction recessed portion 41A is formed to partially protrude, and on the right edge 94d side of the main panel 94, the recessed portion part 82A that configures the left side wall 48A of the right side restriction recessed portion 46A is formed to partially protrude.

Figure 18:
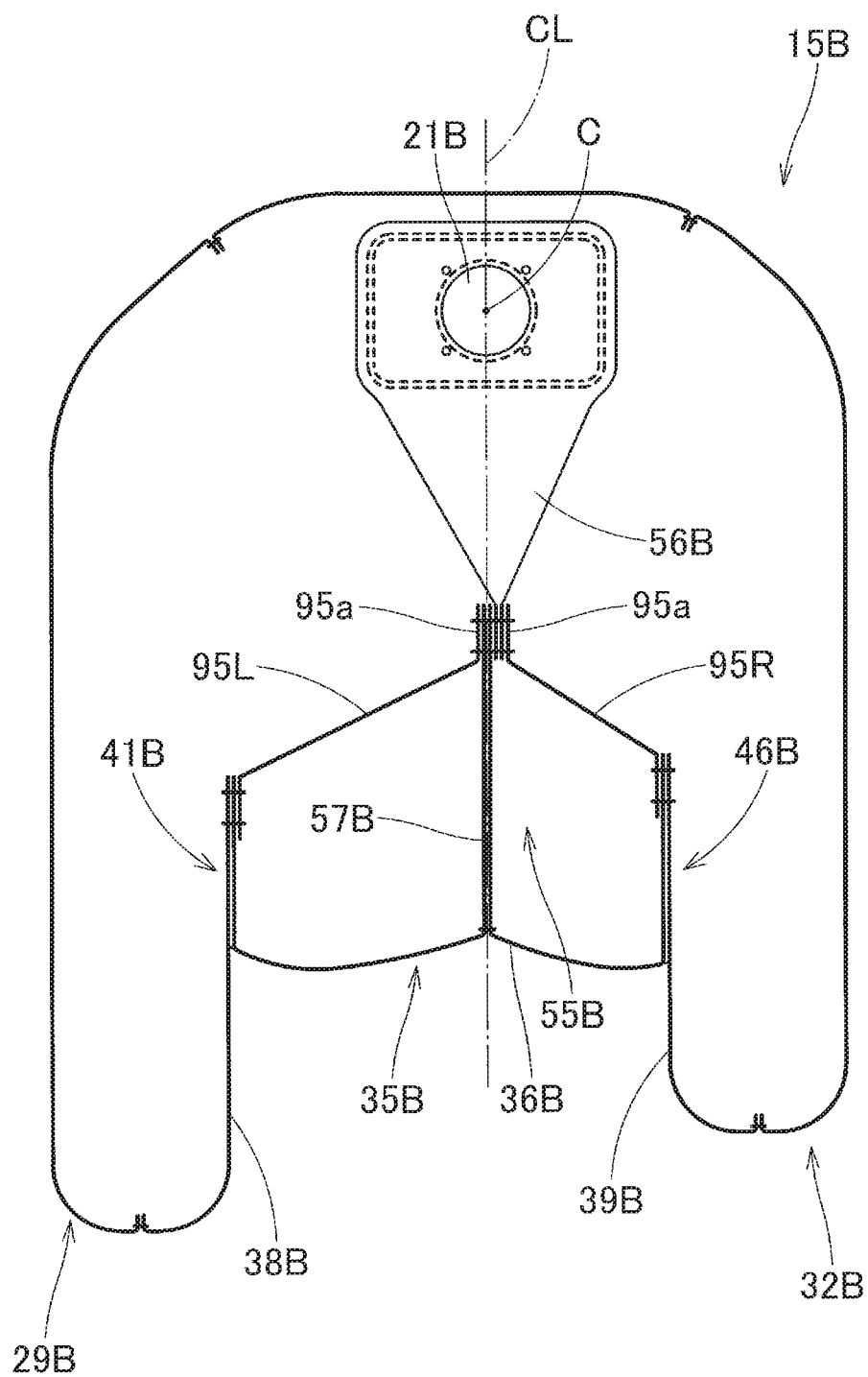
FIG. 18 is a schematic horizontal sectional view of a state where an airbag of still another embodiment of the invention is inflated as a single body.

In addition, in the airbag 15 of the embodiment, each of the recessed portion tethers 60L and 60R is linked to the front end 17a side of the bag main body 16 (main body inflation portion 17) by coupling the linking portions 63L and 63R to the circumferential edge of the gas inflow port 21. However, similar to an airbag 15B illustrated in FIG. 18, recessed portion tethers 95L and 95R may be configured to be linked to the front end side of the airbag 15B by sewing the front end 95a in common at a sewing part between a front part 56B and a rear side part 57B of a front-and-rear tether 55B. In other words, in the airbag 15B, the recessed portion tethers 95L and 95R are linked to the front end 17a side of the airbag 15B via the front part 56B of the front-and-rear tether 55B in the region which is the rear side of the gas inflow port 21B. Furthermore, in this manner, in a case where the front end side of the recessed portion tether is disposed at the position on the rear side of the gas inflow port, similar to the airbag 15C illustrated in FIG. 19, a configuration may be adopted in which the front-and-rear tether is not disposed and front ends of recessed portion tethers 95CL and 95CR are linked to the front end side of the airbag 15C by sewing the front ends in common at the rear end of a linking member 96 that extends from the circumferential edge of the gas inflow port 21C. In other words, in the airbag 15C, the recessed portion tethers 95CL and 95CR are disposed so as to branch from the linking member 96 respectively by using the linking member 96 that serves as a front part that extends from the front end side of the airbag 15C in common.

Figure 20:
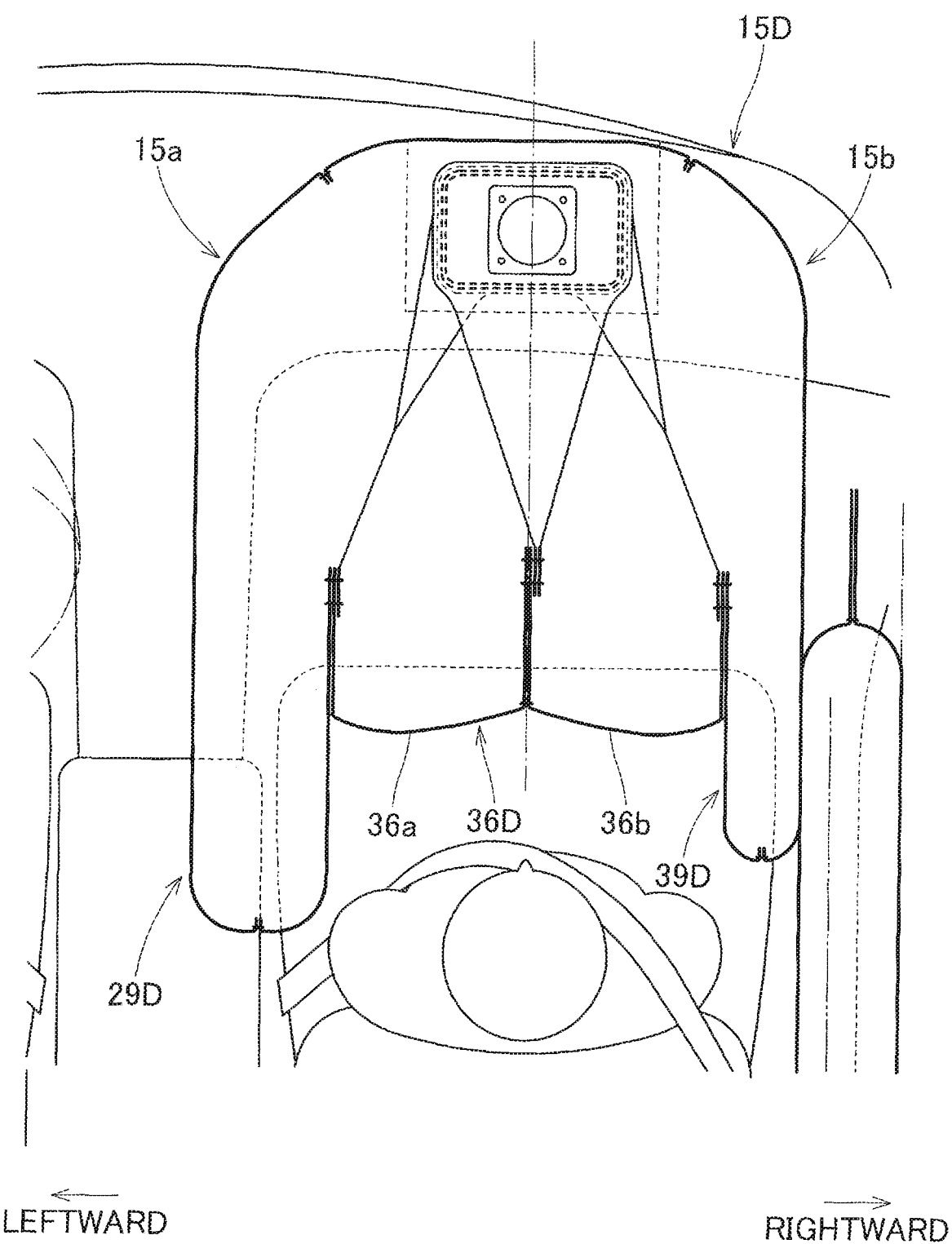
FIG. 20 is a schematic horizontal sectional view illustrating a state where an airbag of still another embodiment of the invention has been inflated in a state of being loaded on the vehicle.

In addition, in the embodiment, by setting the protrusion amount from the main body inflation portion 17 of the right side protrusion inflation portion 32 to be smaller than the protrusion amount from the main body inflation portion 17 of the left side protrusion inflation portion 29, and by setting the length dimension (width dimension) in the left-right direction at the left side part 36a which is the region on the left side from the linking part (a point that passes through the center line CL that extends from the attachment center C) with the front-and-rear tether 55 on the frontal collision restriction surface 36 to be greater than that of the right side part 36b, the capacity of the remote side region (right side region 15b) disposed on the side away from the driver seat DS when the airbag 15 is divided substantially into two in the left-right direction side around the attachment center C to the case 12, is set to be smaller than that of the driver seat side region (left side region 15a) to be disposed on the driver seat DS side. The setting of the capacity is not limited to the embodiment. For example, the capacity of the driver seat side region and the capacity of the remote side region may differ from each other by making only one of the protrusion amount of the protrusion inflation portion or the length dimension in the left-right direction of the frontal collision restriction surface different. Further, similar to an airbag 15D illustrated in FIG. 20, the capacity of the left side region 15a (driver seat side region) and the capacity of the right side region 15b (remote side region) may differ from each other by setting the length dimensions in the left-right direction in the left side part 36a and the right side part 36b in a frontal collision restriction surface 36D to be substantially the same as each other, by setting the protrusion amount with respect to a left side protrusion inflation portion 29D to be smaller than that of the right side protection inflation portion 39D, and by setting the width dimension in the left-right direction of the left side protrusion inflation portion 29D to be smaller than that of the right side protrusion inflation portion 39D. Furthermore, in the airbag 15 of the embodiment, the capacity of the protrusion inflation portion itself of the left side protrusion inflation portion 29 and the capacity of the protrusion inflation portion itself of the right side protrusion inflation portion 32 are configured to differ from each other by setting the width dimensions (thickness) in the left-right direction when the inflation is completed to be substantially the same as each other, and by setting the protrusion amounts from the main body inflation portion 17 to be different from each other. Not being limited thereto, for example, the capacity may differ by setting the protrusion amounts from the main body inflation portion to be substantially the same as each other, and by setting the thickness dimension when the inflation is completed to be different from each other. Furthermore, in the airbag 15 of the embodiment, the left side restriction recessed portion 41 disposed on the driver seat DS side and the right side restriction recessed portion 46 disposed on the side away from the driver seat DS are set to have substantially the same outer shape. Not being limited thereto, the width dimension (depth) in the front-rear direction of the right side restriction recessed portion disposed on the side remote from the driver seat may be set to be smaller than the width dimension (depth) in the front-rear direction in the left side restriction recessed portion disposed on the driver seat side. Furthermore, in the embodiment, the airbag 15 is loaded in the vehicle V such that the attachment center C is substantially identical to the center in the left-right direction of the passenger seat PS. Not being limited thereto, the airbag may be loaded in the vehicle such that the attachment center is slightly shifted to the left side (driver seat side) from the center in the left-right direction of the passenger seat.

Figure 21:
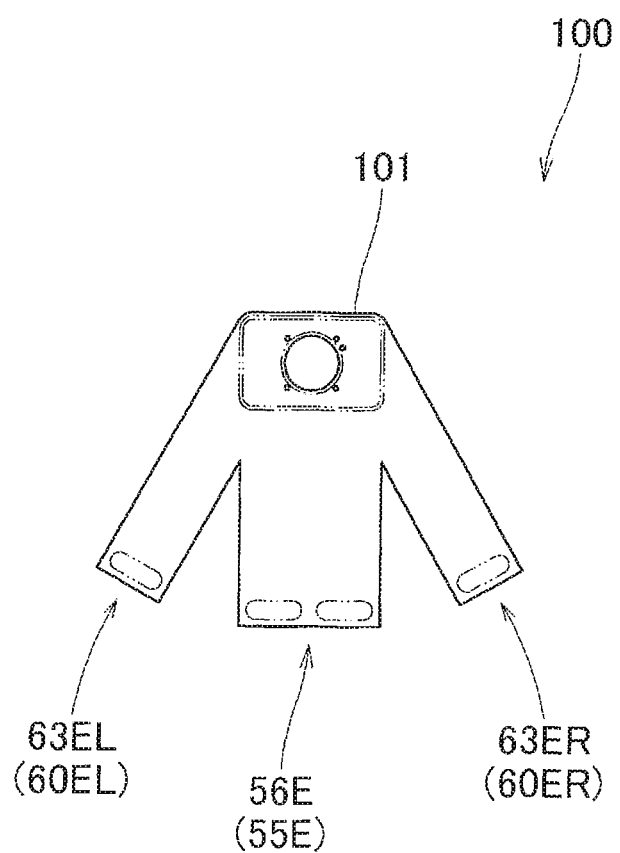
FIG. 21 is a plan view illustrating a modification example of a tethering base fabric that can be used for the airbag of the embodiment of the invention.

In addition, in the airbag 15 of the embodiment, the tethering base fabric 62L and 62R that configure the recessed portion tethers 60L and 60R are formed separately from the front side part base material 58 that configures the front side part 56 of the front-and-rear tether 55, and are linked to the circumferential edge of the gas inflow port 21. However, similar to tethering base fabric 100 illustrated in FIG. 21, a configuration in which a front side part 56E of a front-and-rear tether 55E and main body portions 63EL and 63ER of the recessed portion tethers 60EL and 60ER are integrated with each other so as to extend from a linking portion 101 respectively by using the linking portion 101 coupled (sewn) to the circumferential edge of the gas inflow port 21 in common, may be used.

What is claimed is:

1. An airbag device, comprising:
   an airbag for a passenger seat, the airbag is folded and stored in a storage part provided in an instrument panel disposed in front of an occupant seated in the passenger seat, to inflate to protrude toward a rear side of a vehicle by allowing an inflation gas to flow to the inside thereof, and to be capable of protecting the occupant,
   wherein a front end side of the airbag when inflation is completed is attached to the storage part at an attachment center, and a rear surface side of the airbag when inflation is completed is configured as an occupant protection section which is capable of protecting the occupant,
   wherein the occupant protection section includes
      a frontal collision restriction surface which is capable of protecting a head of the occupant who moves forward when frontal collision of the vehicle occurs,
      two oblique collision restriction surfaces which are formed both on the left and right sides of the frontal collision restriction surface to be capable of protecting the head of the occupant who moves obliquely forward when oblique collision or offset collision of the vehicle occurs, and
      restriction recessed portions which are respectively installed to be recessed forward between the frontal collision restriction surface and each of the oblique collision restriction surfaces for allowing the head of the occupant to enter and to be restricted,
   wherein the airbag is configured to install a recessed portion tether which links a tip end side of a recess of each of the restriction recessed portions and the front end side of the airbag, to the inside thereof,
   wherein, when inflation is completed, at the time of substantially dividing the airbag into two around the vicinity of the attachment center to the storage part in the left-right direction, a remote side region disposed on a side away from a driver seat and a driver seat side region disposed on the driver seat side are provided,
   wherein the capacity of the remote side region is set to be smaller than that of the driver seat side region,
   wherein the airbag for the passenger seat includes a main body inflation portion and two protrusion inflation portions which are disposed to protrude rearward from a rear surface side of the main body inflation portion when the inflation is completed, and disposed to be remote from each other in the left-right direction,
   wherein the frontal collision restriction surface is configured with a rear surface of the main body inflation portion when the inflation is completed,
   wherein, in each of the protrusion inflation portions, when the inflation is completed, side wall portions disposed to protrude rearward from the rear surface of the main body inflation portion respectively configured the oblique collision restriction surface,
   wherein the airbag device further includes a head protecting airbag that is folded and stored on an upper edge of a side window of the passenger seat and configured to be deployed over the side window when inflated with an inflation gas,
   wherein the head protecting airbag is configured such that a front end of a head protecting airbag inflation portion is disposed at a position that is forward of the frontal collision restriction surface of the airbag for the passenger seat as viewed from an up-down direction,
   wherein, among the protrusion inflation portions, a remote side protrusion inflation portion disposed on the side remote from the driver seat is smaller in width in the left-rightdirection at airbag deployment than a driver seat side protrusion inflation portion disposed on the driver seat side and than the head protecting airbag, and
   wherein a front end of at least one of the restriction recessed portions is disposed at a position that is forward of the front end of the inflation portionof head protecting airbag.

2. The airbag device according to claim 1,
wherein each of the recessed portion tethers is respectively disposed to branch from the front side part using the front side part that extends from the front end side of the airbag for the passenger seat in common.

3. The airbag device according to claim 1,
wherein, on the inside of the airbag for the passenger seat, a front-and-rear tether which links the frontal collision restriction surface and the front end side of the airbag for the passenger seat, and which is capable of suppressing rearward movement of the frontal collision restriction surface at airbag deployment is installed to extend rearward from the attachment center and substantially along a front-rear direction when the inflation is completed, and
wherein, on the frontal collision restriction surface, a length dimension in the left-right direction when the inflation is completed at a driver seat side part disposed to be closer to the driver seat side than the front-and-rear tether is set to be greater than that of a remote side part disposed to be closer to the remote side away from the driver seat than the front-and-rear tether.

4. The airbag device according to claim 3,
wherein the front-and-rear tether is configured by linking a front side part that extends from the front end side of the airbag for the passenger seat and a rear side part that extends from the frontal collision restriction surface side to each other, and
wherein front ends of each of the recessed portion tethers are jointly sewn at a sewing part between the front side part and the rear side part, and are linked to the front end side of the airbag via the front side part.

5. The airbag device according to claim 1,
wherein, in the protrusion inflation portions, a protrusion amount from the main body inflation portion when the inflation is completed in the remote side protrusion inflation portion is set to be smaller than that of the driver seat side protrusion inflation portion.

\* \* \* \* \*